United States Patent
Lee et al.

(10) Patent No.: US 11,071,021 B2
(45) Date of Patent: Jul. 20, 2021

(54) SECURITY KEY DERIVATION FOR HANDOVER

(71) Applicant: QUALCOMM Incorporated, San Diego, CA (US)

(72) Inventors: Soo Bum Lee, San Diego, CA (US); Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/035,239

(22) Filed: Jul. 13, 2018

(65) Prior Publication Data

US 2019/0037454 A1 Jan. 31, 2019

Related U.S. Application Data

(60) Provisional application No. 62/538,626, filed on Jul. 28, 2017.

(51) Int. Cl.
*H04W 36/00* (2009.01)
*H04L 12/46* (2006.01)
(Continued)

(52) U.S. Cl.
CPC ......... *H04W 36/0038* (2013.01); *H04L 12/04* (2013.01); *H04L 12/4625* (2013.01);
(Continued)

(58) Field of Classification Search
CPC ........... H04W 36/00837; H04W 12/04; H04W 12/06; H04W 36/32; H04W 36/00;
(Continued)

(56) References Cited

U.S. PATENT DOCUMENTS 8,072,939 B2 * 12/2011 Iwamura ......... H04W 12/04071
370/331
8,213,940 B2 * 7/2012 Hapsari ........... H04W 12/04071
455/436
(Continued)

FOREIGN PATENT DOCUMENTS

CN 101715188 A 5/2010
CN 102017675 A 4/2011
(Continued)

OTHER PUBLICATIONS

International Search Report and Written Opinion—PCT/US2018/042292—ISA/EPO—dated Oct. 4, 2018.
(Continued)

*Primary Examiner* — Man U Phan
(74) *Attorney, Agent, or Firm* — Holland & Hart LLP

(57) ABSTRACT

Methods, systems, and devices for wireless communication are described that support security key derivation for handover. A network entity (e.g., an access and mobility function (AMF)) may establish an access stratum (AS) key to ensure secure communications between a user equipment (UE) and a base station. If the UE relocates to a new network entity (e.g., target network entity), the initial network entity (e.g., source network entity) may perform a handover procedure to the target network entity. In some aspects, the network entities may derive a unified AS key for the handover procedure. Additionally, the network entities may utilize one or more intermediate keys (e.g., refreshed intermediate keys) derived from, in part, respective freshness parameters for the handover procedure. The target network entity may then utilize the derived intermediate keys to derive the AS key for the handover procedure and establish communications with the UE.

27 Claims, 24 Drawing Sheets

(51) Int. Cl.
*H04L 12/04* (2006.01)
*H04W 12/041* (2021.01)
*H04L 29/06* (2006.01)
*H04W 12/04* (2021.01)
*H04W 12/06* (2021.01)
*H04W 36/32* (2009.01)

(52) U.S. Cl.
CPC ........... *H04L 63/062* (2013.01); *H04W 12/04* (2013.01); *H04W 12/041* (2021.01); *H04W 12/06* (2013.01); *H04W 36/00* (2013.01); *H04W 36/0072* (2013.01); *H04W 36/00837* (2018.08); *H04W 36/32* (2013.01)

(58) Field of Classification Search
CPC .......... H04W 36/0038; H04W 12/0401; H04L 63/062; H04L 12/04; H04L 12/4625; H04L 29/06
USPC .......................................................... 370/331
See application file for complete search history.

(56) References Cited

U.S. PATENT DOCUMENTS

| | | | | |
|---|---|---|---|---|
| 9,167,424 | B2* | 10/2015 | Wu | H04W 12/04033 |
| 9,681,339 | B2* | 6/2017 | Chen | H04W 12/04031 |
| 9,817,720 | B2* | 11/2017 | Horn | H04W 36/0038 |
| 10,237,787 | B2* | 3/2019 | Sharma | H04W 12/04031 |
| 10,362,511 | B2* | 7/2019 | Youn | H04W 36/0011 |
| 10,524,166 | B2* | 12/2019 | Youn | H04W 8/02 |
| 2010/0172500 | A1* | 7/2010 | Wu | H04W 12/06 380/272 |
| 2010/0173610 | A1* | 7/2010 | Kitazoe | H04W 12/04031 455/411 |
| 2011/0128937 | A1 | 6/2011 | Iwamura et al. | |
| 2015/0215838 | A1* | 7/2015 | Li | H04W 12/04 370/331 |
| 2017/0078874 | A1 | 3/2017 | Lee et al. | |
| 2017/0265108 | A1* | 9/2017 | Chen | H04W 12/0602 |
| 2018/0302834 | A1* | 10/2018 | Zhang | H04W 36/38 |
| 2019/0098537 | A1* | 3/2019 | Qiao | H04W 36/0033 |
| 2019/0141482 | A1* | 5/2019 | Edge | H04W 36/14 |
| 2019/0274038 | A1* | 9/2019 | Wu | H04W 36/0033 |
| 2020/0008109 | A1* | 1/2020 | Li | H04W 76/12 |
| 2020/0092758 | A1* | 3/2020 | Youn | H04W 8/02 |
| 2020/0112898 | A1* | 4/2020 | Ramle | H04W 36/08 |
| 2020/0120570 | A1* | 4/2020 | Youn | H04W 36/0033 |
| 2020/0120571 | A1* | 4/2020 | Zong | H04W 36/32 |
| 2020/0128403 | A1* | 4/2020 | Wu | H04W 12/08 |

FOREIGN PATENT DOCUMENTS

| | | |
|---|---|---|
| CN | 102281535 A | 12/2011 |
| CN | 103686708 A | 3/2014 |
| CN | 103781069 A | 5/2014 |
| CN | 105830476 A | 8/2016 |
| EP | 2288194 A1 | 2/2011 |
| EP | 2429227 A1 | 3/2012 |
| EP | 2897398 A1 | 7/2015 |
| WO | WO-2011160059 A1 | 12/2011 |
| WO | WO-2014112262 A1 | 7/2014 |

OTHER PUBLICATIONS

NEC: "pCR to TR 33.899: Inter AMF, Intra SMF, Inter NG RAN Handover without Xn Interface", 3GPP Draft; Draft S3-171602_WAS S3-171181R1_PCR to TR 33.899_INTER_AMF, Intra SMF, Tnter NG RAN Handover Without XN Interface, 3rd Generation Partnership Project (3GPP), Mobile Competence Centre, 650, Route Des Lucioles, F-06921 Sophia-Antipolis Cedex, France, vol. SA WG3, No. Ljubljana; May 15, 2017-May 19, 2017 Jun. 5, 2017, XP051284072, Retrieved from the Internet: URL:http://www.3gpp.org/ftp/tsg_sa/WG3_Security/TSGS3_87_Ljubljana/Docs/ [retrieved on Jun. 5, 2017], 2 pages.

NEC: "pCR to TR 33.899: Inter NG (R)AN Handover with Xn Interface", 3GPP Draft; S3-171178, 3rd Generation Partnership Project (3GPP), Mobile Competence Centre, 650, Route Des Lucioles, F-06921 Sophia-Antipolis Cedex, France, vol. SA WG3, No. Ljubljana; May 15, 2017-May 19, 2017 May 14, 2017, XP051282677, Retrieved from the Internet: URL:http://www.3gpp.org/ftp/Meetings_3GPP_SYNC/SA3/Docs/ [retrieved on May 14, 2017], 2 pages.

* cited by examiner

SECURITY KEY DERIVATION FOR HANDOVER

CROSS REFERENCES

The present Application for Patent claims the benefit of U.S. Provisional Patent Application No. 62/538,626 by Lee et al., entitled "Security Key Derivation for Handover," filed Jul. 28, 2017, assigned to the assignee hereof, and expressly incorporated by reference in its entirety.

BACKGROUND

The following relates generally to wireless communication, and more specifically to security key derivation for handover.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communication systems, a network entity (e.g., a mobility management entity (MME)) may utilize one or more security keys to facilitate secure communications across the network (e.g., between a UE and a base station). A security key may be derived from a number of parameters or key derivation functions (KDFs). In some cases, the network may derive an initial security key using a different method or parameters than subsequent security keys, which may result in complicated and chained key derivations. Further, derivation of a security key at a target network entity may delay a handover procedure due to the signaling of security key parameters between the target network entity and other network entities.

SUMMARY

The described techniques relate to improved methods, systems, devices, or apparatuses that support security key derivation for handover. The described techniques provide for a network entity (e.g., an access and mobility function (AMF)) to identify a handover trigger for a handover of a user equipment (UE) from a source network entity (e.g., a source AMF) to a target network entity (e.g., a target AMF). Prior to or during the handover process, the source AMF may generate an intermediate key for the target AMF. The intermediate key may be generated based on a freshness parameter and may be transmitted to the target AMF. The target AMF may utilize the intermediate key and a second freshness parameter to generate a base station base key at the target AMF.

A method of wireless communication is described. The method may include identifying a handover trigger that triggers a handover from a source network entity to a target network entity, generating a refreshed intermediate key based at least in part on a first freshness parameter and the handover trigger, and transmitting the refreshed intermediate key to the target network entity.

An apparatus for wireless communication is described. The apparatus may include means for identifying a handover trigger that triggers a handover from a source network entity to a target network entity, means for generating a refreshed intermediate key based at least in part on a first freshness parameter and the handover trigger, and means for transmitting the refreshed intermediate key to the target network entity.

Another apparatus for wireless communication is described. The apparatus may include a processor, memory in electronic communication with the processor, and instructions stored in the memory. The instructions may be operable to cause the processor to identify a handover trigger that triggers a handover from a source network entity to a target network entity, generate a refreshed intermediate key based at least in part on a first freshness parameter and the handover trigger, and transmit the refreshed intermediate key to the target network entity.

A non-transitory computer readable medium for wireless communication is described. The non-transitory computer-readable medium may include instructions operable to cause a processor to identify a handover trigger that triggers a handover from a source network entity to a target network entity, generate a refreshed intermediate key based at least in part on a first freshness parameter and the handover trigger, and transmit the refreshed intermediate key to the target network entity.

Some examples of the method, apparatus, and non-transitory computer-readable medium described above may further include processes, features, means, or instructions for generating an intermediate key based at least in part on a network entity base key, wherein the intermediate key may be different from the refreshed intermediate key.

Some examples of the method, apparatus, and non-transitory computer-readable medium described above may further include processes, features, means, or instructions for generating a source base station base key that may be based at least in part on the intermediate key and a second freshness parameter.

Some examples of the method, apparatus, and non-transitory computer-readable medium described above may further include processes, features, means, or instructions for transmitting the source base station base key to a source base station.

Some examples of the method, apparatus, and non-transitory computer-readable medium described above may further include processes, features, means, or instructions for generating a refreshed source base station base key based at least in part on the second freshness parameter.

In some examples of the method, apparatus, and non-transitory computer-readable medium described above, the second freshness parameter comprises a counter reserved for refreshing the source base station base key.

Some examples of the method, apparatus, and non-transitory computer-readable medium described above may further include processes, features, means, or instructions for generating an encryption key for non-access stratum (NAS) signaling and an integrity key for NAS signaling based at least in part on the network entity base key.

In some examples of the method, apparatus, and non-transitory computer-readable medium described above, the first freshness parameter comprises an uplink NAS count, a downlink NAS count, a counter reserved for refreshing an intermediate key at the source network entity, or a combination thereof.

In some examples of the method, apparatus, and non-transitory computer-readable medium described above, the refreshed intermediate key comprises a network entity base key for the target network entity.

In some examples of the method, apparatus, and non-transitory computer-readable medium described above, the network entity base key for the target network entity may be configured exclusively for generating a target base station base key.

In some examples of the method, apparatus, and non-transitory computer-readable medium described above, the source network entity comprises a source AMF and the target network entity comprises a target AMF.

In some examples of the method, apparatus, and non-transitory computer-readable medium described above, the refreshed intermediate key may be configured exclusively for generating a target base station base key.

A method of wireless communication is described. The method may include identifying a handover trigger that triggers a handover from a source network entity to a target network entity, receiving a refreshed intermediate key from the source network entity, wherein the refreshed intermediate key is based at least in part on a first freshness parameter and is configured exclusively for generating a target base station base key, and generating the target base station base key based at least in part on the refreshed intermediate key and a second freshness parameter.

An apparatus for wireless communication is described. The apparatus may include means for identifying a handover trigger that triggers a handover from a source network entity to a target network entity, means for receiving a refreshed intermediate key from the source network entity, wherein the refreshed intermediate key is based at least in part on a first freshness parameter and is configured exclusively for generating a target base station base key, and means for generating the target base station base key based at least in part on the refreshed intermediate key and a second freshness parameter.

Another apparatus for wireless communication is described. The apparatus may include a processor, memory in electronic communication with the processor, and instructions stored in the memory. The instructions may be operable to cause the processor to identify a handover trigger that triggers a handover from a source network entity to a target network entity, receive a refreshed intermediate key from the source network entity, wherein the refreshed intermediate key is based at least in part on a first freshness parameter and is configured exclusively for generating a target base station base key, and generate the target base station base key based at least in part on the refreshed intermediate key and a second freshness parameter.

A non-transitory computer readable medium for wireless communication is described. The non-transitory computer-readable medium may include instructions operable to cause a processor to identify a handover trigger that triggers a handover from a source network entity to a target network entity, receive a refreshed intermediate key from the source network entity, wherein the refreshed intermediate key is based at least in part on a first freshness parameter and is configured exclusively for generating a target base station base key, and generate the target base station base key based at least in part on the refreshed intermediate key and a second freshness parameter.

In some examples of the method, apparatus, and non-transitory computer-readable medium described above, the refreshed intermediate key may be distinct from an intermediate key used at the source network entity.

In some examples of the method, apparatus, and non-transitory computer-readable medium described above, the refreshed intermediate key comprises a chained key of a network entity base key.

Some examples of the method, apparatus, and non-transitory computer-readable medium described above may further include processes, features, means, or instructions for generating the target base station base key based at least in part on an intermediate key and a third freshness parameter.

In some examples of the method, apparatus, and non-transitory computer-readable medium described above, the third freshness parameter comprises a counter reserved for refreshing the target base station base key.

In some examples of the method, apparatus, and non-transitory computer-readable medium described above, the source network entity comprises a source AMF and the target network entity comprises a target AMF.

In some examples of the method, apparatus, and non-transitory computer-readable medium described above, the first freshness parameter comprises an uplink NAS count, a downlink NAS count, a counter reserved for refreshing an intermediate key at the source network entity, or a combination thereof.

In some examples of the method, apparatus, and non-transitory computer-readable medium described above, the second freshness parameter comprises a counter reserved for refreshing the target base station base key.

Some examples of the method, apparatus, and non-transitory computer-readable medium described above may further include processes, features, means, or instructions for transmitting the target base station base key to a target base station.

Some examples of the method, apparatus, and non-transitory computer-readable medium described above may further include processes, features, means, or instructions for receiving a refreshed network entity base key after the handover may be complete.

Some examples of the method, apparatus, and non-transitory computer-readable medium described above may further include processes, features, means, or instructions for generating an encryption key for NAS signaling and an integrity key for NAS signaling based at least in part on the refreshed network entity base key.

A method of wireless communication is described. The method may include receiving a handover command message from a source network entity that triggers a handover to a target network entity, receiving an indication of a first freshness parameter, and generating a refreshed intermediate key based at least in part on the first freshness parameter and the handover command message, wherein the refreshed intermediate key is configured exclusively for generating a target base station base key.

An apparatus for wireless communication is described. The apparatus may include means for receiving a handover command message from a source network entity that triggers a handover to a target network entity, means for receiving an indication of a first freshness parameter, and means for generating a refreshed intermediate key based at least in part on the first freshness parameter and the handover command message, wherein the refreshed intermediate key is configured exclusively for generating a target base station base key.

Another apparatus for wireless communication is described. The apparatus may include a processor, memory in electronic communication with the processor, and instructions stored in the memory. The instructions may be operable to cause the processor to receive a handover command message from a source network entity that triggers a handover to a target network entity, receive an indication of a first freshness parameter, and generate a refreshed intermediate key based at least in part on the first freshness parameter and the handover command message, wherein the refreshed intermediate key is configured exclusively for generating a target base station base key.

A non-transitory computer readable medium for wireless communication is described. The non-transitory computer-readable medium may include instructions operable to cause a processor to receive a handover command message from a source network entity that triggers a handover to a target network entity, receive an indication of a first freshness parameter, and generate a refreshed intermediate key based at least in part on the first freshness parameter and the handover command message, wherein the refreshed intermediate key is configured exclusively for generating a target base station base key.

Some examples of the method, apparatus, and non-transitory computer-readable medium described above may further include processes, features, means, or instructions for receiving an indication of a second freshness parameter. Some examples of the method, apparatus, and non-transitory computer-readable medium described above may further include processes, features, means, or instructions for generating the target base station base key based at least in part on the refreshed intermediate key and the second freshness parameter.

Some examples of the method, apparatus, and non-transitory computer-readable medium described above may further include processes, features, means, or instructions for receiving an indication of an updated second freshness parameter. Some examples of the method, apparatus, and non-transitory computer-readable medium described above may further include processes, features, means, or instructions for refreshing the target base station base key based at least in part on the updated second freshness parameter.

Some examples of the method, apparatus, and non-transitory computer-readable medium described above may further include processes, features, means, or instructions for receiving an indication of an updated refreshed intermediate key. Some examples of the method, apparatus, and non-transitory computer-readable medium described above may further include processes, features, means, or instructions for refreshing the target base station base key based at least in part on the updated refreshed intermediate key.

Some examples of the method, apparatus, and non-transitory computer-readable medium described above may further include processes, features, means, or instructions for receiving an indication of an updated first freshness parameter. Some examples of the method, apparatus, and non-transitory computer-readable medium described above may further include processes, features, means, or instructions for refreshing the target base station base key based at least in part on the updated first freshness parameter.

Some examples of the method, apparatus, and non-transitory computer-readable medium described above may further include processes, features, means, or instructions for communicating with a target base station based at least in part on the target base station base key.

In some examples of the method, apparatus, and non-transitory computer-readable medium described above, the second freshness parameter comprises a counter reserved for refreshing the target base station base key.

Some examples of the method, apparatus, and non-transitory computer-readable medium described above may further include processes, features, means, or instructions for generating an intermediate key based at least in part on a network entity base key, wherein the intermediate key may be different from the refreshed intermediate key.

Some examples of the method, apparatus, and non-transitory computer-readable medium described above may further include processes, features, means, or instructions for receiving an indication that the refreshed intermediate key may be configured exclusively for generating the target base station base key.

In some examples of the method, apparatus, and non-transitory computer-readable medium described above, the first freshness parameter comprises an uplink NAS count, a downlink NAS count, a counter reserved for refreshing an intermediate key at the source network entity, or a combination thereof.

In some examples of the method, apparatus, and non-transitory computer-readable medium described above, the source network entity comprises a source AMF and the target network entity comprises a target AMF.

DETAILED DESCRIPTION

Figure 1:
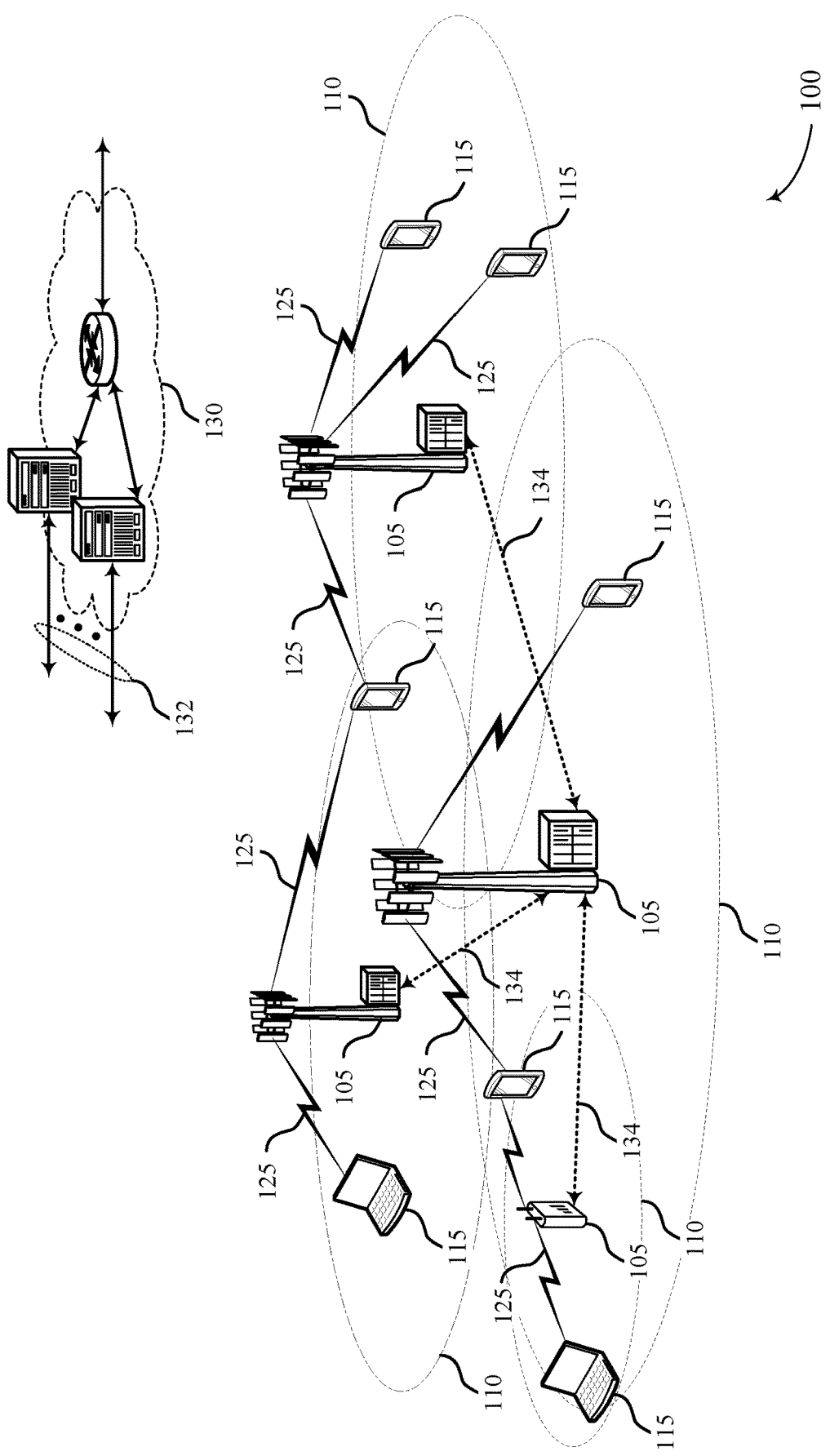
FIG. 1 illustrates an example of a wireless communications system that supports security key derivation for handover in accordance with aspects of the present disclosure.

The described techniques relate to improved methods, systems, devices, or apparatuses that support security key derivation for handover. A network entity (e.g., a mobility management entity (MME) or an access and mobility function (AMF)) may utilize an access stratum (AS) key to ensure secure communications between a user equipment (UE) and a base station or between other network entities across the network. If network conditions start to deteriorate or the UE needs to relocate to a new network entity (e.g., due to UE mobility/relocation), a network entity (e.g., source network entity) may initiate a handover procedure to a new network entity (e.g., target network entity). In some aspects, the source and target network entities may derive an AS key (e.g., $K_{gNB}$) in a unified way for the handover procedure based on an intermediate key. For example, the procedure for deriving the AS key (e.g., $K_{gNB}$) may be based on this intermediate key regardless if the AS key is being derived for the first time or for a subsequent time, which may increase efficiency and reduce complexity over techniques where the AS key is derived differently between the first and subsequent derivations.

In some aspects, the intermediate key may be an AS root key (e.g., $K_{AS\_root}$) derived from the network entity key (e.g., $K_{AMF}$). The intermediate key may be shared between the UE and the network entity and the intermediate key may also be used to facilitate secure communication between the UE and the network entity. The source network entity may derive a refreshed intermediate key based on a freshness parameter and then transmit the refreshed intermediate key to the target network entity. The target network entity may then utilize the derived intermediate key to derive the AS key (e.g., $K_{gNB}$). In this way, transmitting a refreshed intermediate key for the purpose of deriving the AS key at the target network entity may provide key separation between the source and target network entities. Also, transmitting an intermediate key (as opposed to a higher-level key such as $K_{AMF}$) may provide enhanced security over techniques where the higher-level key is shared between entities. Moreover, using the intermediate key in this way may facilitate an efficient handover process because the target network entity may begin to derive the AS key to send to the target base station before having to receive or derive a higher-level key from another network entity (e.g., a new $K_{AMF}$). Use of an intermediate key in such a manner may be used also for inter-system handover (e.g., between a next generation system and a legacy system).

Aspects of the disclosure are initially described in the context of a wireless communications system. Various key derivations are then described. A process flow illustrating aspects of the disclosure is also described. Aspects of the disclosure are further illustrated by and described with reference to apparatus diagrams, system diagrams, and flowcharts that relate to security key derivation for handover.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., S1, N2, N3). Base stations 105 may communicate with one another over backhaul links 134 (e.g., X2, Xn) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP)

layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to other time interval.

Time intervals in LTE or NR may be expressed in multiples of a basic time unit, which may refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 millisecond (ms). A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds (μs)). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

The core network 130 may include several entities (e.g., functions) such as AMFs, session management functions (SMFs), user plane functions (UPFs), and others. One or more of the entities of the core network may be virtually implemented in software. In some examples, the UEs 115 and base stations 105 may communicate with an entity of the core network 130 (e.g., an MME or AMF) to establish a secure connection for communications. The AMF may provide access and mobility management services for the UEs 115 and base stations 105. In some examples, the AMF may serve as the primary point of control plane signaling communications with the UEs 115 and base stations 105, such that a majority of control plane communications between the UEs 115, base stations 105, and the core network 130 pass through the AMF.

In some examples, a UE 115 may initiate a connection process with the base station 105 by sending an attach request. Based on the attach request, the base station 105 may facilitate authentication and/or authorization of the UE 115 through a core network 130 (e.g., via one or more entities of the core network 130). Once authenticated, the UE 115 may communicate with the core network 130 based on a non-access stratum (NAS) protocol configured to securely establish and maintain connectivity between the UE 115 and the core network 130. One or more core network nodes (e.g., an AMF, a MME, serving gateway, etc.) may inform the base station 105 that the UE 115 is authenticated and authorized to connect to the wireless communications system 100. Thereafter, the base station 105 may establish a radio resource control (RRC) connection with the UE 115 (e.g., based on an AS protocol).

To establish an RRC connection, the base station 105 may generate and transmit a security configuration to the UE 115 during the execution of the AS protocol or after the AS protocol has been performed. In some examples, the security configuration may be transmitted to the UE 115 over a secure radio channel (e.g., a secure RRC channel), which may be established based at least in part on a shared key associated with the base station 105 and the UE 115. In some examples, the shared key may be a gNB key (e.g., $K_{gNB}$) or an eNB key ($K_{eNB}$), which may be transmitted to the base station 105 by a core network node (e.g., during or subsequent to the authentication and key agreement (AKA) process) and/or derived by the UE 115.

The base station 105 may then generate an encoded message that includes an allocation of resources and in particular, a shared pattern of resources allocated for uplink control information for the UE 115. In one example, the encoded message may be encrypted based on the shared key and provided to the UE 115 over a secure RRC channel. In another example, the encoded message may be encrypted in a PDCCH message. The encrypted PDCCH message may be encrypted using an encryption key. The encryption key may be transmitted from the base station 105 to the UE 115 during the RRC connection and/or may be transmitted over a secure RRC channel (e.g., after an RRC connection is established). Using the secure RRC channel may prevent other devices, such as a jamming device, from intercepting the encryption key. In some examples, the encryption key may be common to all UEs 115 connected to or attempting to connect to the base station 105. In some cases, the encryption key may be randomly generated by the base station 105 or the core network 130. In some examples, the encryption key may be derived based on a shared key associated with the base station 105 and the UE 115, such as a $K_{gNB}$ (or $K_{eNB}$).

In some wireless communications systems 100 (e.g., LTE), a home subscriber server (HSS) may generate an access security management entity (ASME) key (e.g., $K_{ASME}$) and signal it to an MME. An initial $K_{eNB}$ may then be derived by the MME utilizing the $K_{ASME}$. A subsequent $K_{eNB}$ may be derived from a next hop (NH) key, where the NH key may be derived from the $K_{ASME}$ and the previous NH key or from the $K_{ASME}$ and the $K_{eNB}$ for an initial NH key derivation. For deriving the different keys (e.g., $K_{eNB}$, NH keys, integrity check keys, ciphering keys, etc.), a UE 115, base station 105, or MME may utilize key derivation functions (KDFs), where each KDF may include certain parameters of an input, S, such as a function code (FC), a parameter 0 (P0), a length of parameter 0 (L0), a parameter 1 (P1), a length of parameter 1 (L1), etc.

In some examples, when deriving the $K_{eNB}$ from the $K_{ASME}$ with an uplink NAS COUNT in a UE 115 and MME, the KDF parameters may consist of an FC value of 0x11, a P0 value equal to the uplink NAS COUNT, and an L0 value equal to the length of the uplink NAS COUNT (e.g., 0x00 0x04). Additionally, the UE 115 and MME may utilize the 256-bit $K_{ASME}$ as the input key. The UE 115 and MME may apply this KDF when establishing cryptographically protected Evolved Universal Mobile Telecommunications System Terrestrial Radio Access Network (E-UTRAN) radio bearers and/or when performing a key change on-the-fly.

In some examples, when deriving the NH key from the $K_{ASME}$, the KDF parameters may consist of an FC value of 0x12, a P0 value equal to a SYNC-input, and a L0 value equal to the length of the SYNC-input (e.g., 0x00 0x20). The SYNC-input parameter may be the newly derived $K_{eNB}$ for the initial NH key derivation or the previous NH key for subsequent NH key derivations. Through this SYNC-input parameter, an NH chain may be formed such that the next NH key may be fresh and derived from the previous NH key. Additionally, the UE 115 and MME may utilize the 256-bit $K_{ASME}$ as the input key.

For handover purposes, the UE 115 and a base station 105 may derive an intermediate key (e.g., $K_{eNB}$*) from the current $K_{eNB}$ or from a fresh NH key and a target physical cell ID. In some examples, the UE 115 and base station 105 may utilize a KDF with parameters consisting of an FC value of 0x13, a P0 value equal to the target physical cell ID, an L0 value equal to the length of the physical cell ID (e.g., 0x00, 0x02), a P1 value equal to a downlink E-UTRA absolute radio frequency channel number downlink (EARFCN-DL) (e.g., a target physical cell downlink frequency), and a L1 value equal to the length of EARFCN-DL (e.g., 0x00 0x02 if EARFCN-DL is between 0 and 65535 or 0x00 0x03 if EARFCN-DL is between 65536 and 262143). In some aspects, the length of EARFCN-DL may not generally be set to 3 bytes (e.g., to support backward compatibility). For example, certain release entities (e.g., a release-8 UE or eNB) may assume an input parameter length of 2 bytes for the EARFCN-DL, which may lead to different derived keys if another entity assumes an input parameter length of 3 bytes for the EARFCN-DL. Additionally, the UE 115 and base station 105 may utilize the 256-bit NH key for the input key if the index in the handover increases, otherwise the current 256-bit $K_{eNB}$ may be utilized for the input key.

In some examples, a vertical (e.g., across frequency) or a horizontal (e.g., across time) key derivation may be performed for handover purposes. For a vertical key derivation, an MME may derive an AS key (e.g., $K_{eNB}$) using a $K_{ASME}$. For a horizontal key derivation, a base station 105 (e.g., an eNB) may derive the AS key using the current $K_{eNB}$. While the initial $K_{eNB}$ may be easily derived, a subsequent $K_{eNB}$ may involve additional or more complicated derivations including intermediate keys and one or more NH keys. Further, $K_{ASME}$ may be shared between MMEs in MME relocation such that a target MME may reuse the key chain used by a source MME. For some wireless communications systems (e.g., 5G/NR), a key separation between network entities (e.g., AMFs) may be needed for handover procedures. However, the AS key (e.g., $K_{gNB}$) may still be derived from the network entity key (e.g., an AMF key ($K_{AMF}$)) that is held by the target or serving network entity, which may result in a delayed handover procedure. For example, the target network entity (e.g., target AMF) may first obtain the network entity key (e.g., $K_{AMF}$) from a security anchor function (SEAF), then agree on the network entity key with a UE 115 based on a NAS security mode command (SMC), and then derive the AS key.

Wireless communications system 100 may support efficient techniques to derive a unified AS key (e.g., $K_{gNB}$) for handover procedures, while taking into account potential key separation between network entities (e.g., AMFs) for forward and backward security by utilizing an intermediate key. In some aspects, the intermediate key may be an AS root key (e.g., $K_{AS\_root}$) derived from the network entity key (e.g., $K_{AMF}$). Alternatively, a limited purpose network entity key (e.g., $K_{AMF}$*) may be derived from the current network entity key and sent to the target entity in the handover. These techniques may provide enhanced security by utilizing an evolving root key since network entity key that derives NAS keys does not need to be shared between network entities, and the target network entity cannot derive the AS keys utilized at previous base stations 105. Additionally, handover procedures may not be delayed regardless of key separation (e.g., for forward and backward security). The techniques described herein may also be used for inter-system handovers (e.g., between a 5G AMF and a 4G MME).

Figure 2:
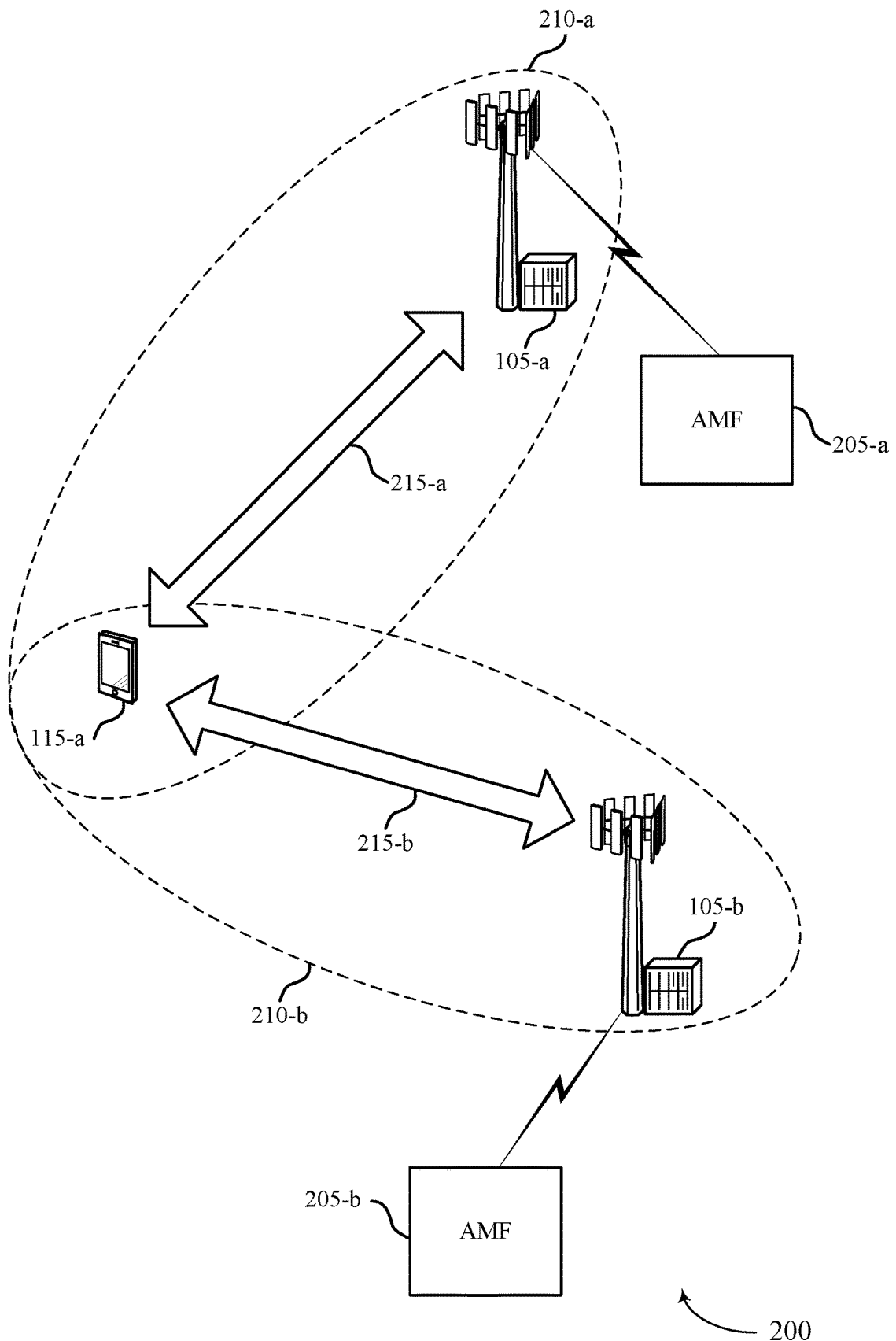
FIG. 2 illustrates an example of a wireless communications system that supports security key derivation for handover in accordance with aspects of the present disclosure.

FIG. 2 illustrates an example of a wireless communications system 200 that supports security key derivation for handover in accordance with various aspects of the present disclosure. In some examples, wireless communications system 200 may implement aspects of wireless communications system 100. Wireless communications system 200 may include a base station 105-a, a base station 105-b, and a UE 115-a, which may be examples of corresponding base stations 105 and UEs 115 as described with reference to FIG. 1. Base station 105-a may communicate with AMF 205-a, and base station 105-b may communicate with AMF 205-b. Each base station 105 and in some aspects, each AMF 205 may provide communication coverage for or be associated with a respective coverage area 210 (e.g., AMF 205-a may be associated with coverage area 210-a and AMF 205-b may be associated with coverage area 210-b). In other examples, each supported coverage area 210 for an AMF 205 may include multiple base stations 105.

As shown, wireless communications system 200 illustrates aspects of UE 115-a performing a handover procedure from AMF 205-a to AMF 205-b. Initially, UE 115-a may communicate securely with base station 105-a and AMF 205-a via resources of a carrier 215-a. In this example, AMF 205-a may be referred to as source AMF 205-a. In order to communicate securely, UE 115-a and base station 105-a may utilize a base station base key ($K_{gNB}$), which may be derived by AMF 205-a similar to the procedure described above with reference to FIG. 1. Additionally, the $K_{gNB}$ derivation may include utilizing an intermediate key (e.g., AS root key ($K_{AS\_root}$)). $K_{AS\_root}$ may be derived from an AMF 205-a key ($K_{AMF}$) and a first freshness parameter. The freshness parameter may include an uplink NAS COUNT, a downlink NAS COUNT, or a new freshness parameter (e.g., COUNT) utilized only for $K_{AS\_root}$ derivation. In some examples, the $K_{gNB}$ derivation may be based on $K_{AS\_root}$ and a second freshness parameter. The second freshness parameter may be a counter maintained at the AMF 205-a for the purpose of generating the $K_{gNB}$. AMF 205-a may utilize the first derivation of $K_{AS\_root}$ when it determines the need for a refresh of the AS security context (e.g., UE 115-a transitions from idle mode to connected mode or in case of an AMF 205 relocation). AMF 205-a may indicate this derivation of $K_{AS\_root}$ to UE 115-a by providing the first freshness parameter.

In some aspects, AMF 205-a may utilize the second derivation of $K_{gNB}$ when a new $K_{gNB}$ is to be derived (e.g., due to UE mobility involving a PDCP anchor change). This may occur in some instance without an AMF 205 relocation or change. AMF 205-a may indicate this derivation of $K_{gNB}$ to UE 115-a by providing the second freshness parameter. In some aspects, the first derivation of $K_{AS\_root}$ may trigger the second derivation of $K_{gNB}$. The second derivation of $K_{gNB}$, however, may occur without the first derivation of $K_{AS\_root}$.

In some examples, the channel conditions of carrier 215-a may change (e.g., deteriorate) or UE 115-a may move outside of coverage area 210-a. This may cause UE 115-a to initiate a handover to base station 105-b, which may also involve a handover from AMF 205-a to AMF 205-b. In this example, AMF 205-b may be referred to as target AMF 205-b. As part of the handover procedure, AMF 205-b may derive a $K_{gNB}$ to enable a secure communication between base station 105-b and UE 115-a using resources of carrier 215-b. To do so, source AMF 205-a may first refresh $K_{AS\_root}$ based on a first freshness parameter and pass the refreshed $K_{AS\_root}$ to target AMF 205-b. Target AMF 205-b may derive $K_{gNB}$ from the refreshed $K_{AS\_root}$ and a second freshness parameter until a new $K_{AMF}$ corresponding to target AMF 205-b is derived (or obtained from a SEAF, for example). As the target AMF 205-b $K_{AMF}$ may be established after the handover completion (e.g., during NAS SMC), the handover procedure of UE 115-a may be completed prior to the establishment of the target AMF 205-b $K_{AMF}$. This may reduce handover delay that may be otherwise due to derivation of the target AMF 205-b $K_{AMF}$ and deriving $K_{gNB}$ based on the target AMF 205-b $K_{AMF}$ prior to completing handover.

Figure 3:
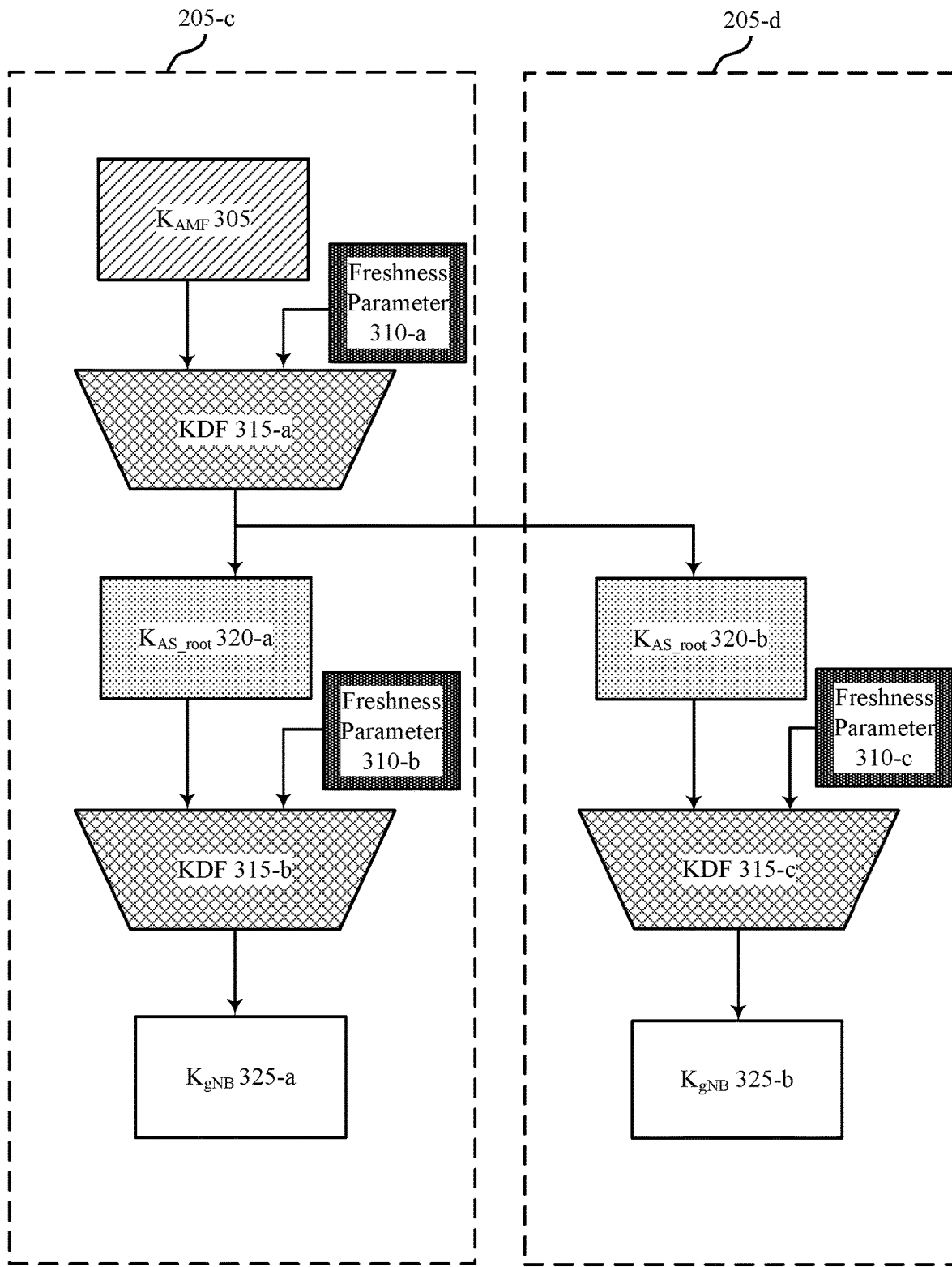
FIGS. 3 through 6 illustrate example key derivations that support security key derivation for handover in accordance with aspects of the present disclosure.

FIG. 3 illustrates an example of a key derivation 300 that supports security key derivation for handover in accordance with various aspects of the present disclosure. Key derivation 300 may include derivations performed by a source AMF 205-c and a target AMF 205-d, which may be examples of source AMF 205-a and target AMF 205-b as described with reference to FIG. 2. Key derivation 300 may illustrate security key derivations performed prior to or during a handover process of a UE 115 from source AMF 205-c to target AMF 205-d.

Source AMF 205-a may initially obtain a $K_{AMF}$ 305 (e.g., from an HSS, Security Anchor Function (SEAF), or Authentication Server Function (AUSF)), which may be used to derive a key (e.g., $K_{gNB}$) used for securing a connection between a UE 115 and a base station 105. When a handover process is initiated, source AMF 205-c may generate an intermediate key (e.g., $K_{AS\_root}$ 320-a) by utilizing KDF 315-a with inputs of $K_{AMF}$ 305 and a freshness parameter 310-a (e.g., a first freshness parameter). In some examples, the freshness parameter 310-a may be a downlink NAS COUNT, uplink NAS COUNT, a reserved counter for refreshing $K_{AMF}$, other bit(s) indicating an AMF 205 relocation, or any combination thereof. The equation for deriving $K_{AS\_root}$ may be represented by Equation (1) as follows.

$$K_{AS\_root}=KDF(K_{AMF}, \text{first freshness parameter}) \quad (1)$$

Source AMF 205-c may then calculate $K_{gNB}$ 325-a by using KDF 315-b with inputs $K_{AS\_root}$ 320-a and a freshness parameter 310-b (e.g., a second freshness parameter that is different from freshness parameter 310-a). In some examples, the freshness parameter 310-b may be a COUNTER maintained at AMF 205-c. The COUNTER may be sent to the UE 115 when a new $K_{gNB}$ is derived based on the current $K_{AS\_root}$ so that the UE 115 is able to derive the same $K_{gNB}$. The equation for $K_{gNB}$ at source AMF 205-c may be represented by Equation (2) as follows.

$$K_{gNB}=KDF(K_{AS\_root}, \text{second freshness parameter}) \quad (2)$$

In some aspects, a UE 115, base station 105, or other network entity may initiate a handover procedure involving an AMF change from source AMF 205-c to target AMF 205-d. In such instances, source AMF 205-c may derive $K_{AS\_root}$ 320-b and provide (e.g., send) $K_{AS\_root}$ 320-b to target AMF 205-d. Although $K_{AS\_root}$ 320-b may be the same as $K_{AS\_root}$ 320-a and, as such, may be derived using Equation (1) above, $K_{AS\_root}$ 320-b may in some cases differ from $K_{AS\_root}$ 320-a. Further, a handover command, which may be sent from a base station 105 to a UE 115 based on the interactions between source AMF 205-c and target AMF 205-d, may include the freshness parameter 310-a (e.g., within a nested NAS downlink message). Target AMF 205-d may then derive $K_{gNB}$ 325-b by using KDF 315-c with inputs $K_{AS\_root}$ 320-b and freshness parameter 310-c (e.g., a second freshness parameter or a third freshness parameter). In some examples, freshness parameter 310-c may be set to an initial value (INIT_VALUE) such as 0 or 1, or may be set to a nonce.

The source AMF 205-c, target AMF 205-d, or a UE 115 may refresh the $K_{gNB}$ before or after a handover procedure (e.g., in the case of UE 115 mobility involving PDCP anchor change without AMF relocation). For example, $K_{gNB}$ may be refreshed by refreshing the freshness parameter 310-b or 310-c (depending on whether at source or target AMF 205). From the perspective of a UE 115, the network may signal the need to refresh $K_{gNB}$ at the UE 115, and the UE 115 may perform a similar procedure to refresh the current $K_{gNB}$ (e.g., by refreshing the corresponding freshness parameter, which may be indicated to the UE 115 or derived locally). The $K_{gNB}$ may also be refreshed at the source AMF 205-c, target AMF 205-d, or a UE 115 by refreshing the $K_{AS\_root}$. The $K_{AS\_root}$ may be refreshed at an AMF 205 and signaled to a UE 115. Refreshing the $K_{AS\_root}$ may be associated with a handover, as described above, or may be employed as another technique for refreshing $K_{gNB}$ at either an AMF 205 or UE 115.

Figure 4:
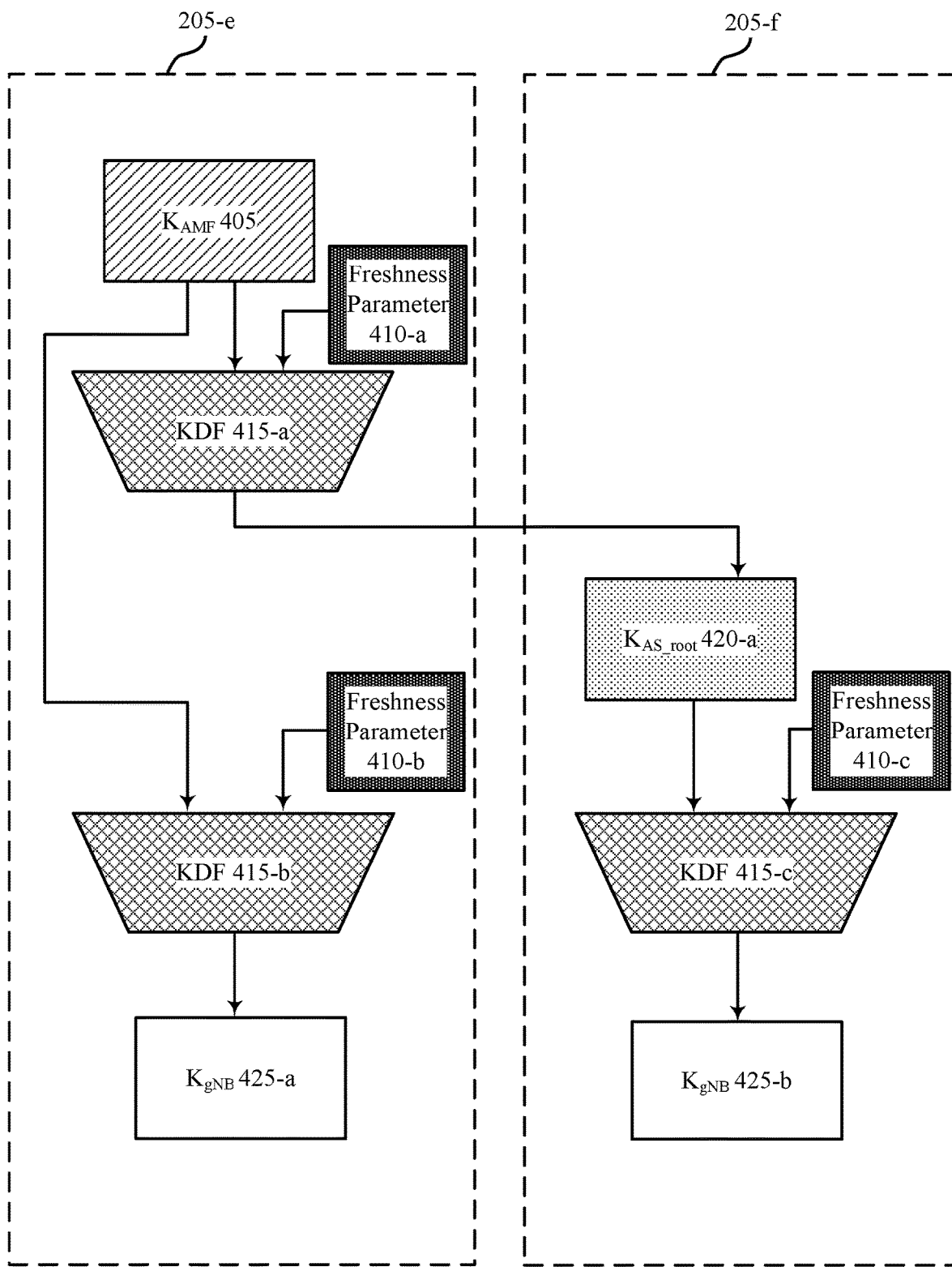

FIG. 4 illustrates an example of a key derivation 400 that supports security key derivation for handover in accordance with various aspects of the present disclosure. Key derivation 400 may include derivations performed by a source AMF 205-e and a target AMF 205-f, which may be examples of respective AMFs 205 as described with reference to FIGS. 2 and 3. Key derivation 400 may illustrate security key derivations performed prior to or during a handover process of a UE 115 from source AMF 205-e to target AMF 205-f.

Source AMF 205-e may initially obtain a $K_{AMF}$ 405 (e.g., from an HSS, SEAF, or AUSF), which may be used to derive a key (e.g., $K_{gNB}$) used for securing a connection between a UE 115 and a base station 105. In some examples, a handover process involving an AMF relocation from source AMF 205-e to target AMF 205-f may be initiated (e.g., by a UE 115 or a base station 105). In such instances, source AMF 205-e may generate an intermediate key (e.g., $K_{AS\_root}$ 420-a) by utilizing KDF 415-a with inputs of $K_{AMF}$ 405 and a freshness parameter 410-a (e.g., a first freshness parameter). Freshness parameter 410-a may be a downlink NAS COUNT, uplink NAS COUNT, a reserved counter for refreshing $K_{AMF}$, other bit(s) indicating an AMF relocation, or any combination thereof.

$K_{AS\_root}$ 420-a may be derived using Equation (1) above and in some aspects, a handover command may include the freshness parameter 410-a (e.g., within a nested NAS downlink message). $K_{AS\_root}$ 420-a may be used temporarily for AS key (e.g., $K_{gNB}$ 425-b) derivation. Target AMF 205-f may then derive $K_{gNB}$ 425-b utilizing KDF 415-c with inputs $K_{AS\_root}$ 420-$a$ and freshness parameter 410-$c$ (e.g., a second freshness parameter). In some examples, freshness parameter 410-$c$ may be set to an initial value (INIT_VALUE) such as 0 or 1, or may be set to a nonce. $K_{AS\_root}$ 420-$a$ may only be used to derive a $K_{gNB}$ at the target AMF 205-$f$ and in some aspects, the usage of $K_{AS\_root}$ 420-$a$ may be indicated to the UE in the handover command.

Source AMF 205-$e$ may utilize KDF 415-$b$ with inputs of $K_{AMF}$ 405 and a freshness parameter 410-$b$ (e.g., a second freshness parameter) to produce the AS key (e.g., $K_{gNB}$ 425-$a$). In some aspects, the freshness parameter 410-$b$ may be a COUNTER maintained at AMF 205-$a$ and the equation for $K_{gNB}$ at source AMF 205-$e$ may be represented by Equation (3) as follows.

$$K_{gNB} = KDF(K_{AMF}, \text{second freshness parameter}) \quad (3)$$

Figure 5:
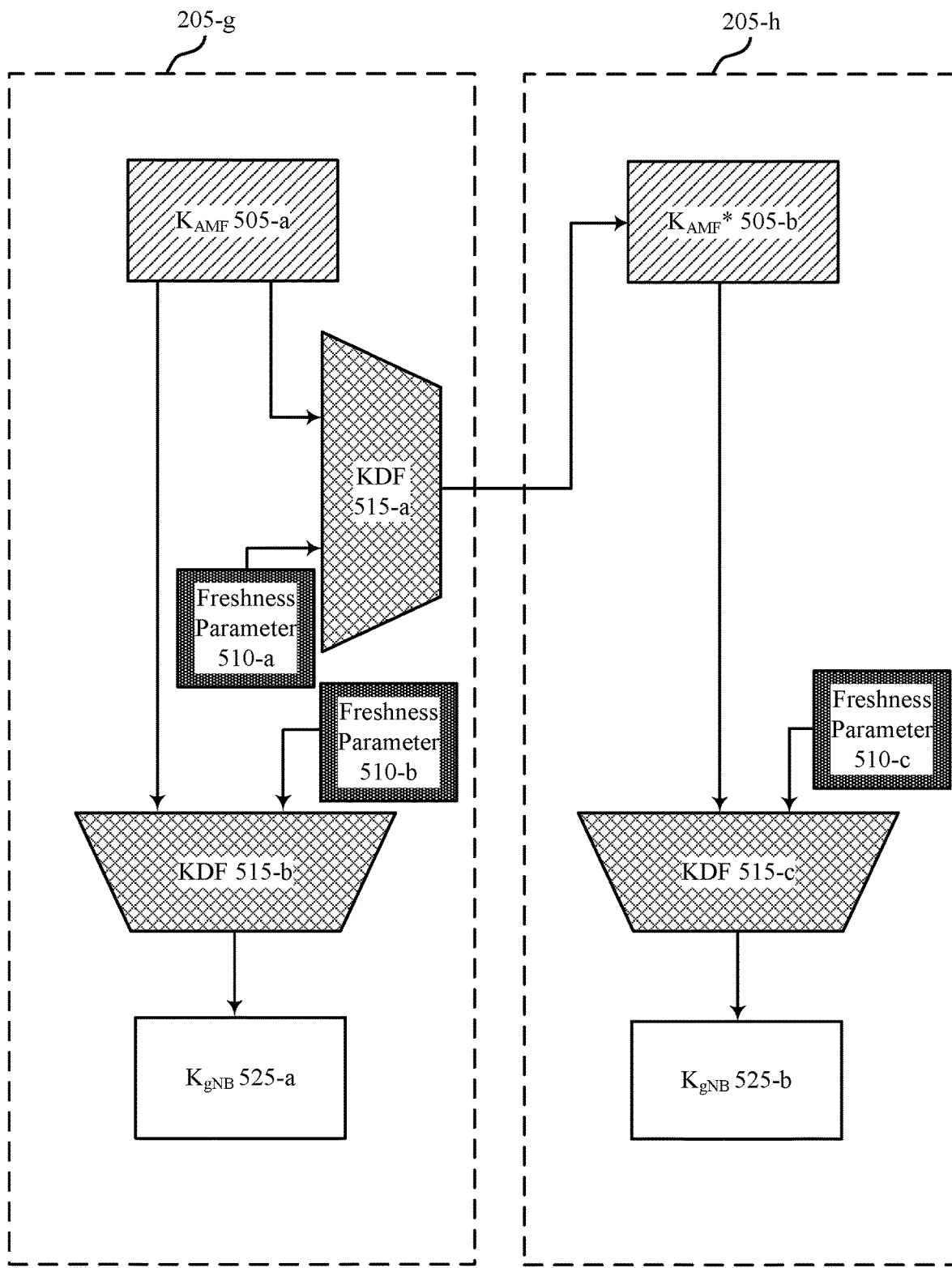

FIG. 5 illustrates an example of a key derivation 500 that supports security key derivation for handover in accordance with various aspects of the present disclosure. Key derivation 500 may include derivations performed by a source AMF 205-$g$ and a target AMF 205-$h$, which may be examples of respective AMFs 205 as described with reference to FIGS. 2 through 4. Key derivation 500 may illustrate key derivations performed prior to or during a handover process of a UE 115 involving an AMF relocation from source AMF 205-$g$ to target AMF 205-$h$.

Source AMF 205-$g$ may initially obtain a $K_{AMF}$ 505 (e.g., from an HSS, SEAF, or AUSF), which may be used to derive a key (e.g., $K_{gNB}$) used for securing a connection between a UE 115 and a base station 105. In some examples, a handover process involving an AMF relocation from source AMF 205-$g$ to target AMF 205-$h$ may be initiated (e.g., by a UE 115 or a base station 105). In such instances, source AMF 205-$g$ may generate an intermediate key (e.g., $K_{AMF}^*$ 505-$b$) from KDF 515-$a$ with inputs $K_{AMF}$ 505-$a$ and a freshness parameter 510-$a$ (e.g., a first freshness parameter). $K_{AMF}^*$ 505-$b$ may be provided to target AMF 205-$h$. Freshness parameter 510-$a$ may be a downlink NAS COUNT, uplink NAS COUNT, a reserved counter for refreshing $K_{AMF}$, other bit(s) indicating an AMF relocation, or any combination thereof. In some examples, a handover command may include the freshness parameter 510-$a$ (e.g., within a nested NAS downlink message) and the equation for $K_{AMF}^*$ 505-$b$ may be represented by Equation (4) as follows.

$$K_{AMF}^* = KDF(K_{AMF}, \text{first freshness parameter}) \quad (4)$$

$K_{AMF}^*$ 505-$b$ may be used for limited purposes such as for $K_{gNB}$ derivation, but may not be used for NAS message protection. The key usage may be indicated to the UE 115 in a handover command. NAS message protection may include establishment of a new $K_{AMF}$ at target AMF 205-$h$, which may be based on SMC. In some aspects, a $K_{AMF}$ 505 for AMF 205-$b$ may be set to $K_{AMF}^*$ 505-$b$ (e.g., in a $K_{AMF}$ refresh within the same AMF 205). Target AMF 205-$b$ may then derive $K_{gNB}$ 525-$b$ utilizing KDF 515-$c$ with inputs $K_{AMF}^*$ 505-$b$ and freshness parameter 510-$c$ (e.g., a second freshness parameter). In some examples, freshness parameter 510-$c$ may be set to an initial value (INIT_VALUE) such as 0 or 1, or may be set to a nonce.

In some aspects, source AMF 205-$g$ may utilize a KDF 515-$b$ with inputs of $K_{AMF}$ 505-$a$ and a freshness parameter 510-$b$ (e.g., a second freshness parameter) to produce the AS key (e.g., $K_{gNB}$ 525-$a$). The freshness parameter 510-$b$ may be a COUNTER maintained at AMF 205-$a$.

Figure 6:
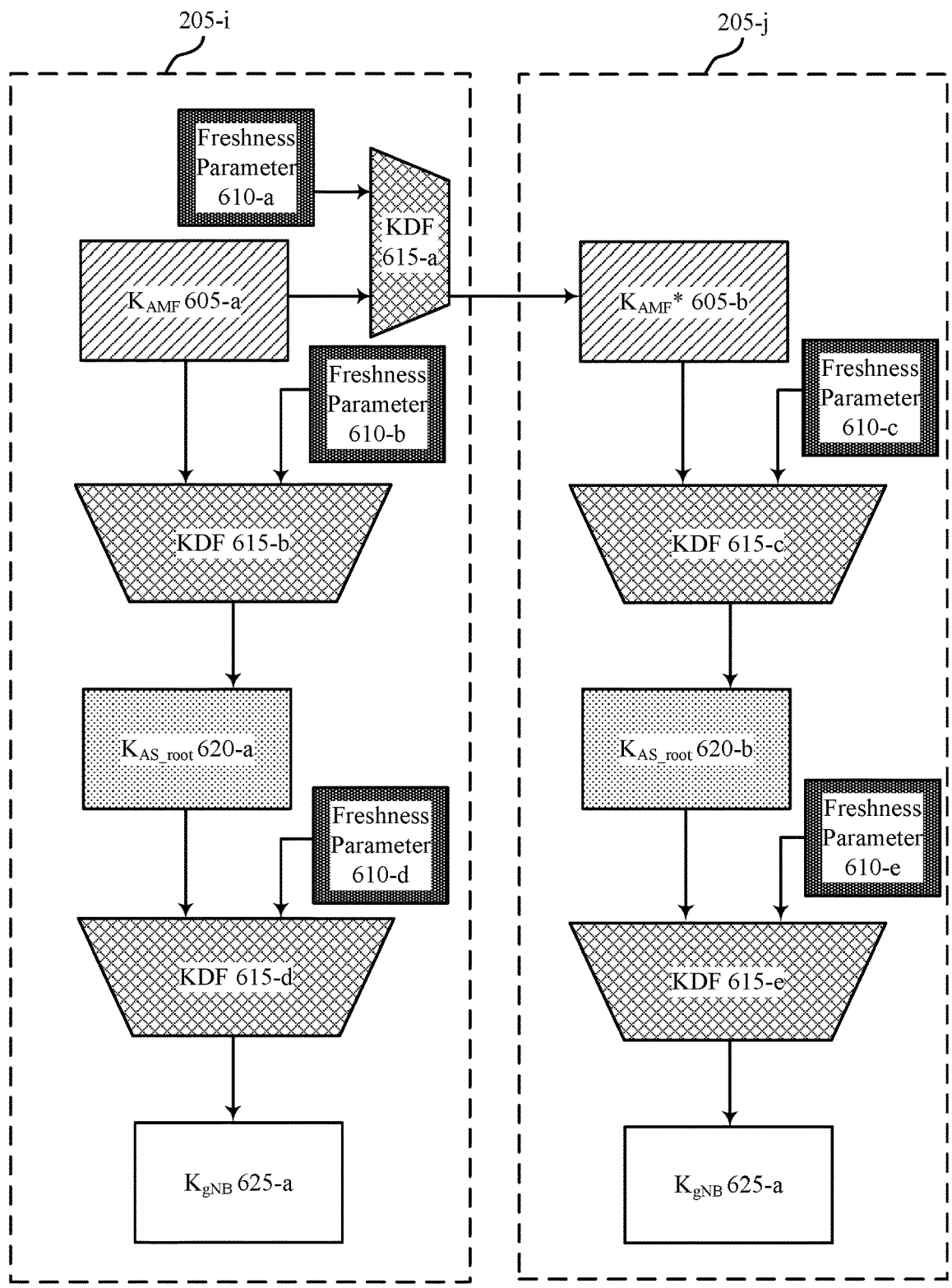

FIG. 6 illustrates an example of a key derivation 600 that supports security key derivation for handover in accordance with various aspects of the present disclosure. Key derivation 600 may include derivations performed by a source AMF 205-$i$ and a target AMF 205-$j$, which may be examples of respective AMFs 205 as described with reference to FIGS. 2 through 5. Key derivation 600 may illustrate derivations performed prior to or during a handover process of a UE 115 from source AMF 205-$i$ to target AMF 205-$j$.

Source AMF 205-$i$ may initially obtain a $K_{AMF}$ 605-$a$ (e.g., from an HSS, SEAF, or AUSF), which may be used to derive a key (e.g., $K_{gNB}$) used for securing a connection between a UE 115 and a base station 105. Source AMF 205-$i$ may utilize a KDF 615-$b$ with inputs of $K_{AMF}$ 605-$a$ and a freshness parameter 610-$b$ (e.g., a first freshness parameter) to produce an intermediate key (e.g., $K_{AS\_root}$ 620-$a$). In some examples, the freshness parameter 610-$b$ may be a downlink NAS COUNT, uplink NAS COUNT, a reserved counter for refreshing $K_{AMF}$, other bit(s) indicating an AMF relocation, or any combination thereof. $K_{AS\_root}$ 620-$a$ may be derived using Equation (1) above. Source AMF 205-$i$ may then calculate a $K_{gNB}$ 625-$a$ by using KDF 615-$d$ with inputs $K_{AS\_root}$ 620-$a$ and a freshness parameter 610-$d$ (e.g., a second freshness parameter). In some aspects, the freshness parameter 610-$d$ may be a COUNTER maintained at AMF 205-$a$ and the COUNTER may be sent to the UE 115 when a new $K_{gNB}$ is derived based on a current $K_{AS\_root}$.

In some examples, a handover process involving an AMF change from source AMF 205-$i$ to target AMF 205-$j$ may be initiated (e.g., by a UE 115 or a base station 105). In such instances, source AMF 205-$i$ may derive an intermediate key, $K_{AMF}^*$ 605-$b$ by utilizing KDF 615-$a$ with inputs $K_{AMF}$ 605-$a$ and a freshness parameter 610-$a$ (e.g., a third freshness parameter). In some examples, $K_{AMF}$ 605-$a$ may be provided to target AMF 205-$j$ and freshness parameter 610-$a$ may be a downlink NAS COUNT, uplink NAS COUNT, a reserved counter for refreshing $K_{AMF}$, other bit(s) indicating an AMF relocation, or any combination thereof. A handover command may include the freshness parameter 610-$a$ (e.g., within a nested NAS downlink message). $K_{AMF}^*$ 605-$b$ may be used for limited purposes (e.g., for $K_{gNB}$ derivation but not for NAS message protection). NAS message protection may include establishment of a new $K_{AMF}$ at target AMF 205-$j$ (e.g., based on SMC). In some aspects, a $K_{AMF}$ 605 for AMF 205-$j$ may be set to $K_{AMF}^*$ 605-$b$ (e.g., in a $K_{AMF}$ refresh within the same AMF 205).

Figure 7:
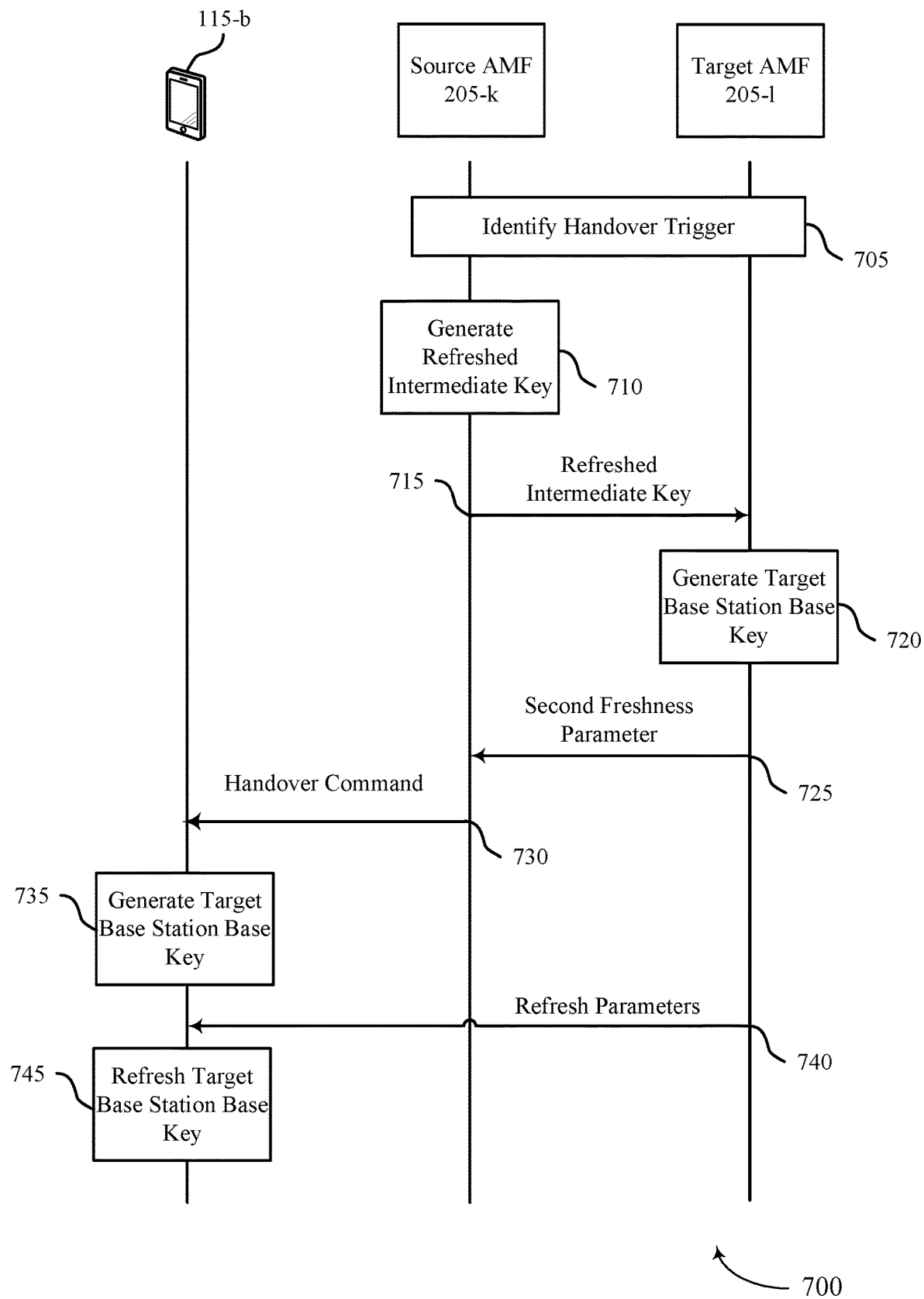
FIG. 7 illustrates an example of a process flow that supports security key derivation for handover in accordance with aspects of the present disclosure.

Target AMF 205-$j$ may then derive $K_{AS\_root}$ 620-$b$ from KDF 615-$c$ with inputs $K_{AMF}^*$ 605-$b$ and a freshness parameter 610-$c$ (e.g., a first freshness parameter). In some examples, the freshness parameter 610-$c$ may be a downlink NAS COUNT. Target AMF 205-$i$ may then derive $K_{gNB}$ 625-$b$ utilizing KDF 615-$e$ with inputs $K_{AS\_root}$ 620-$b$ and freshness parameter 610-$e$ (e.g., a second freshness parameter). In some examples, freshness parameter 610-$e$ may be set to an initial value (INIT_VALUE) such as 0 or 1, or may be set to a nonce FIG. 7 illustrates an example of a process flow 700 that supports security key derivation for handover in accordance with various aspects of the present disclosure. Process flow 700 illustrates aspects of techniques performed by a UE 115-$b$, a source AMF 205-$k$, and a target AMF 205-1, which may be respective examples of a UE 115 and respective AMF 205$s$ as described with reference to FIGS. 1 through 6.

In the following description of the process flow 700, the operations between the UE 115-$b$, the source AMF 205-$k$, and the target AMF 205-1 may be performed in different orders or at different times. Certain operations may also be left out of the process flow 700, or other operations may be added to the process flow 700.

At 705, source AMF 205-k and target AMF 205-1 may identify a handover trigger that triggers a handover from a source network entity (e.g., source AMF 205-k) to a target network entity (e.g., target AMF 205-1). For example, the handover trigger may be sent from a base station, such as a source gNB serving UE 115-b. The source base station may convey the handover decision to a target base station (e.g., a target gNB) and to a network entity associated with the source base station (e.g., a source AMF such as source AMF 205-k).

At 710, source AMF 205-k may generate a refreshed intermediate key (e.g., $K_{AS\_root}$). The refreshed intermediate key may be generated based on a first freshness parameter as described with reference to FIGS. 2-6. The first freshness parameter may include an uplink NAS count, a downlink NAS count, a counter reserved for refreshing an intermediate key at the source network entity, or a combination thereof. The refreshed intermediate key may be configured exclusively for generating a target base station base key (e.g., $K_{gNB}$), and this limited purpose may be signaled to the UE 115-b.

At 715, source AMF 205-k may transmit the refreshed intermediate key to the target AMF 205-1. In some examples, the intermediate key may be transmitted as part of a forward relocation request. The refreshed intermediate key may be different from an intermediate key used at the source AMF 205-k, which may promote key separation between the two AMFs.

At 720, target AMF 205-1 may generate a target base station base key (e.g., a $K_{gNB}$) based on the received refreshed intermediate key. The target base station base key may also be generated based on a second freshness parameter as described with reference to FIGS. 2-6. The target AMF 205-1 may then send a handover request to the target base station. In some examples, the target base station may send a handover acknowledgement message to the target AMF 205-1.

At 725, the target AMF 205-1 may transmit the second freshness parameter to the source AMF 205-k. In some examples, the second freshness parameter is conveyed as part of a forward relocation response message.

At 730, the source AMF 205-k may send a handover command message to the UE 115-b (e.g., via the source base station). The handover command message may also indicate the first and second freshness parameters. The handover command may also indicate that the intermediate key to be generated at the UE 115-b is for the limited purpose of generating the base station base key (e.g., $K_{gNB}$).

At 735, the UE 115-b may generate the target base station base key based on the handover command, the first freshness parameter, the second freshness parameter, or a combination thereof. Upon generating the target base station base key associated with the target base station, the UE 115-b may then securely communicate with the target base station.

At 740, and after the handover procedure has completed, the target AMF 205-1 (or the target base station) may transmit signaling to the UE 115-b to refresh the base station base key (e.g., the $K_{gNB}$). The signaling may include parameters for the UE 115-b to use to refresh the base station base key, such as a refreshed or updated intermediate key (e.g., a refreshed $K_{AS\_root}$) or a refreshed or updated second freshness value.

At 745, UE 115-b may refresh the target base station base key based at least in part on the updated second freshness parameter or the updated intermediate key.

Figure 8:
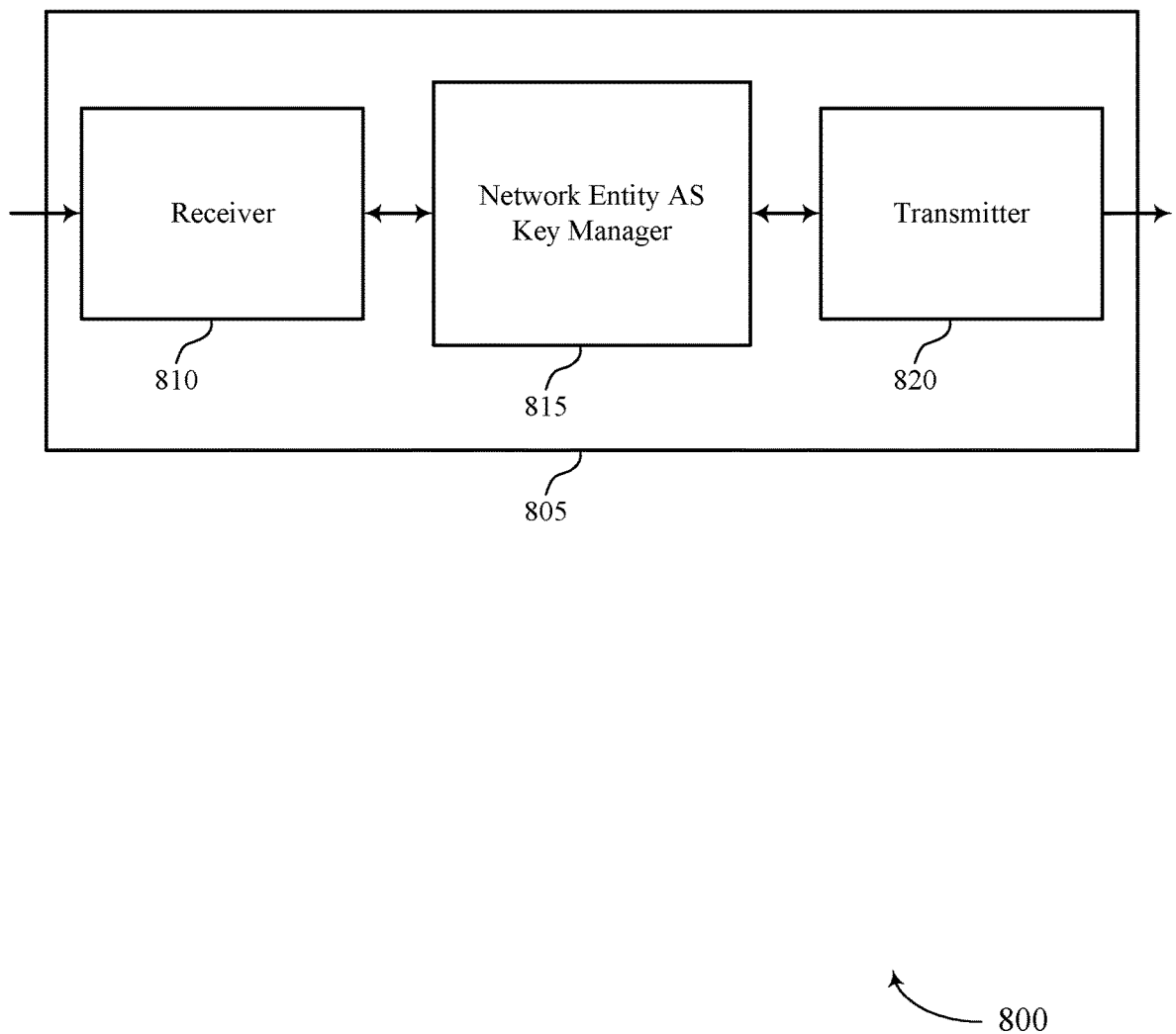
FIGS. 8 through 10 show block diagrams of a device that supports security key derivation for handover in accordance with aspects of the present disclosure.

FIG. 8 shows a block diagram 800 of a wireless device 805 that supports security key derivation for handover in accordance with aspects of the present disclosure. Wireless device 805 may be an example of aspects of a base station 105 or a network entity 205 (e.g., a source AFM or a target AMF), as described herein. Wireless device 805 may include receiver 810, network entity AS key manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to security key derivation for handover, etc.). Information may be passed on to other components of the device. The receiver 810 may be an example of aspects of the transceiver 1135 described with reference to FIG. 11. The receiver 810 may utilize a single antenna or a set of antennas.

Network entity AS key manager 815 may be an example of aspects of the network entity AS key manager 1115 described with reference to FIG. 11.

Network entity AS key manager 815 and/or at least some of its various sub-components may be implemented in hardware, software executed by a processor, firmware, or any combination thereof. If implemented in software executed by a processor, the functions of the network entity AS key manager 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The network entity AS key manager 815 and/or at least some of its various sub-components may be physically located at various positions, including being distributed such that portions of functions are implemented at different physical locations by one or more physical devices.

In some examples, network entity AS key manager 815 and/or at least some of its various sub-components may be a separate and distinct component in accordance with various aspects of the present disclosure. In other examples, network entity AS key manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some examples, the network entity AS key manager 815 may be a source AMF or a source base station. In such cases, network entity AS key manager 815 may identify a handover trigger that triggers a handover from a source network entity to a target network entity, generate a refreshed intermediate key based on a first freshness parameter and the handover trigger, and transmit the refreshed intermediate key to the target network entity.

In some examples, the network entity AS key manager 815 may be a target AMF or a target base station. In such cases, the network entity AS key manager 815 may identify a handover trigger that triggers a handover from a source network entity to a target network entity, receive a refreshed intermediate key from the source network entity, where the refreshed intermediate key is based on a first freshness parameter and is configured exclusively for generating a target base station base key, and generate the target base station base key based on the refreshed intermediate key and a second freshness parameter.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
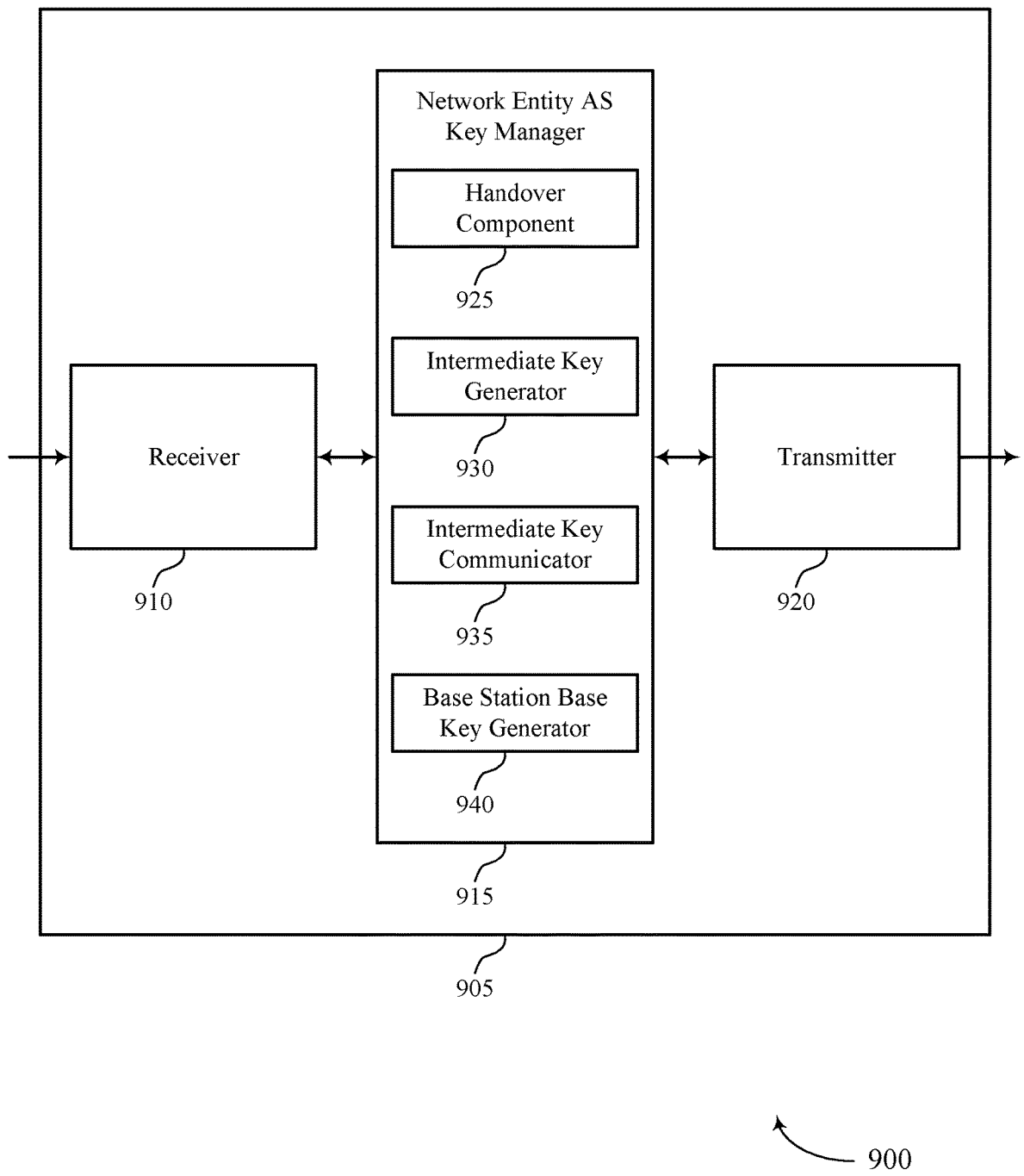

FIG. 9 shows a block diagram 900 of a wireless device 905 that supports security key derivation for handover in accordance with aspects of the present disclosure. Wireless device 905 may be an example of aspects of a wireless device 805 or a network entity 205 as described with reference to FIG. 8. Wireless device 905 may include receiver 910, network entity AS key manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to security key derivation for handover, etc.). Information may be passed on to other components of the device. The receiver 910 may be an example of aspects of the transceiver 1135 described with reference to FIG. 11. The receiver 910 may utilize a single antenna or a set of antennas.

Network entity AS key manager 915 may be an example of aspects of the network entity AS key manager 1115 described with reference to FIG. 11. Network entity AS key manager 915 may also include handover component 925, intermediate key generator 930, intermediate key communicator 935, and base station base key generator 940.

Handover component 925 may identify a handover trigger that triggers a handover from a source network entity to a target network entity. In some cases, the source network entity includes a source AMF and the target network entity includes a target AMF.

Intermediate key generator 930 may generate an intermediate key based on a network entity base key, where the intermediate key is different from the refreshed intermediate key. In some examples, intermediate key generator 930 may generate a refreshed intermediate key based on a first freshness parameter and the handover trigger. In some cases, the first freshness parameter includes an uplink NAS count, a downlink NAS count, a counter reserved for refreshing an intermediate key at the source network entity, or a combination thereof. In some cases, the refreshed intermediate key includes a network entity base key for the target network entity. In some cases, the network entity base key for the target network entity is configured exclusively for generating a target base station base key. In some cases, the refreshed intermediate key is configured exclusively for generating a target base station base key.

Intermediate key communicator 935 may transmit the refreshed intermediate key to the target network entity and receive a refreshed intermediate key from the source network entity, where the refreshed intermediate key is based on a first freshness parameter and is configured exclusively for generating a target base station base key. In some cases, the refreshed intermediate key is distinct from an intermediate key used at the source network entity. In some cases, the refreshed intermediate key includes a chained key of a network entity base key. In some cases, the first freshness parameter includes an uplink NAS count, a downlink NAS count, a counter reserved for refreshing an intermediate key at the source network entity, or a combination thereof.

Base station base key generator 940 may generate a source base station base key that is based on the intermediate key and a second freshness parameter, generate a refreshed source base station base key based on the second freshness parameter, generate the target base station base key based on the refreshed intermediate key and a second freshness parameter, and generate the target base station base key based on an intermediate key and a third freshness parameter. In some cases, the second freshness parameter includes a counter reserved for refreshing the source base station base key. In some cases, the third freshness parameter includes a counter reserved for refreshing the target base station base key. In some cases, the second freshness parameter includes a counter reserved for refreshing the target base station base key.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
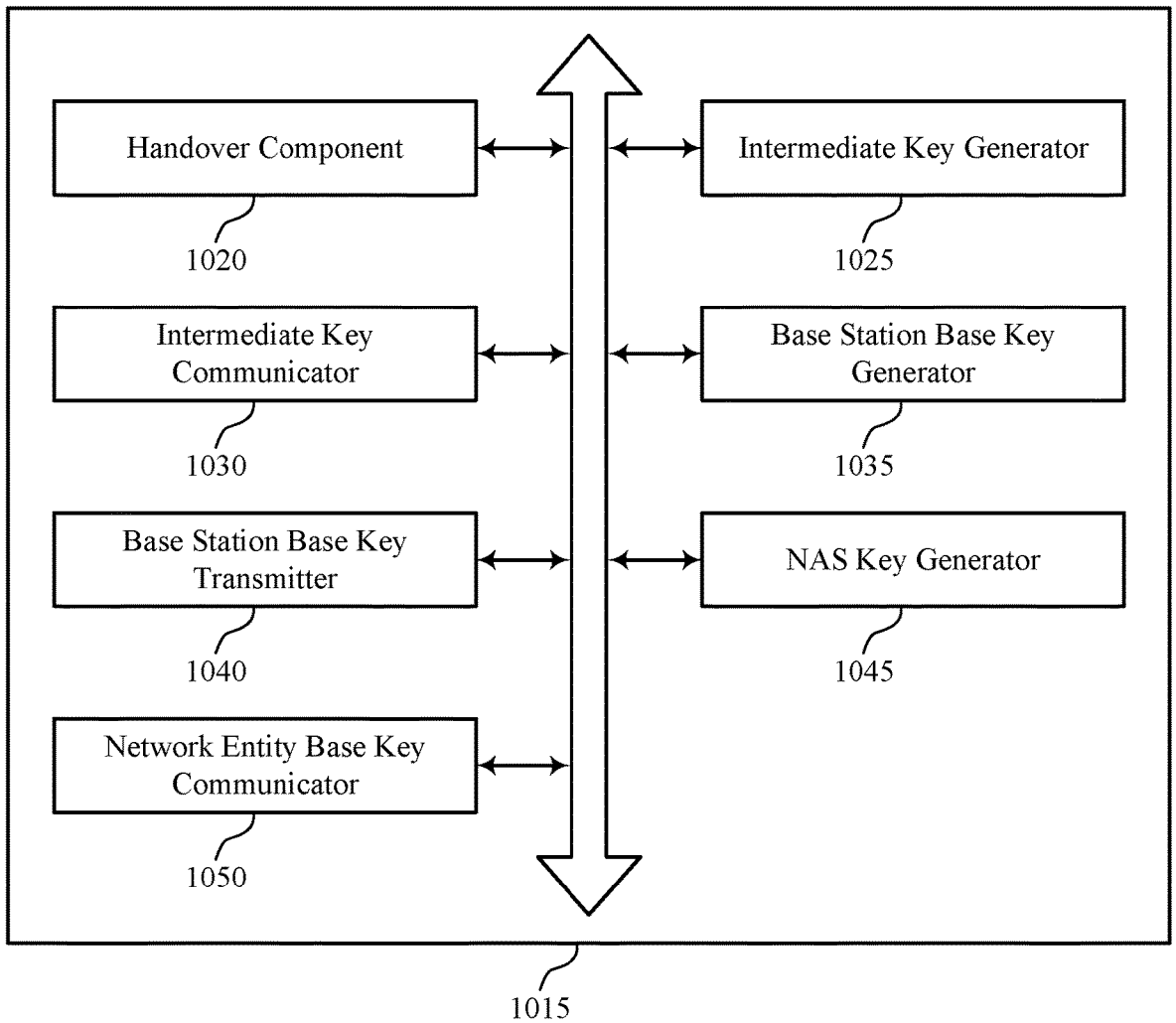

FIG. 10 shows a block diagram 1000 of a network entity AS key manager 1015 that supports security key derivation for handover in accordance with aspects of the present disclosure. The network entity AS key manager 1015 may be an example of aspects of a network entity AS key manager 815, a network entity AS key manager 915, or a network entity AS key manager 1115 described with reference to FIGS. 8, 9, and 11. The network entity AS key manager 1015 may include handover component 1020, intermediate key generator 1025, intermediate key communicator 1030, base station base key generator 1035, base station base key transmitter 1040, NAS key generator 1045, and network entity base key communicator 1050. Each of these modules may communicate, directly or indirectly, with one another (e.g., via one or more buses).

Handover component 1020 may identify a handover trigger that triggers a handover from a source network entity to a target network entity. In some cases, the source network entity includes a source AMF and the target network entity includes a target AMF.

Intermediate key generator 1025 may generate an intermediate key based on a network entity base key, where the intermediate key is different from the refreshed intermediate key. In some examples, intermediate key generator 1025 may generate a refreshed intermediate key based on a first freshness parameter and the handover trigger. In some cases, the first freshness parameter includes an uplink NAS count, a downlink NAS count, a counter reserved for refreshing an intermediate key at the source network entity, or a combination thereof. In some instances, the refreshed intermediate key includes a network entity base key for the target network entity. In some aspects, the network entity base key for the target network entity is configured exclusively for generating a target base station base key. In some cases, the refreshed intermediate key is configured exclusively for generating a target base station base key.

Intermediate key communicator 1030 may transmit the refreshed intermediate key to the target network entity and receive a refreshed intermediate key from the source network entity, where the refreshed intermediate key is based on a first freshness parameter and is configured exclusively for generating a target base station base key. In some cases, the refreshed intermediate key is distinct from an intermediate key used at the source network entity. In some examples, the refreshed intermediate key includes a chained key of a network entity base key. In some aspects, the first freshness parameter includes an uplink NAS count, a downlink NAS count, a counter reserved for refreshing an intermediate key at the source network entity, or a combination thereof.

Base station base key generator 1035 may generate a source base station base key that is based on the intermediate key and a second freshness parameter and generate a refreshed source base station base key based on the second freshness parameter. Base station base key generator 1035 may generate the target base station base key based on the refreshed intermediate key and a second freshness parameter and generate the target base station base key based on an intermediate key and a third freshness parameter. In some cases, the second freshness parameter includes a counter reserved for refreshing the source base station base key. In some examples, the third freshness parameter includes a counter reserved for refreshing the target base station base key. In some aspects, the second freshness parameter includes a counter reserved for refreshing the target base station base key.

Base station base key transmitter 1040 may transmit the source base station base key to a source base station and transmit the target base station base key to a target base station.

NAS key generator 1045 may generate an encryption key for NAS signaling and an integrity key for NAS signaling based on the network entity base key and generate an encryption key for NAS signaling and an integrity key for NAS signaling based on the refreshed network entity base key.

Network entity base key communicator 1050 may receive a refreshed network entity base key after the handover is complete.

Figure 11:
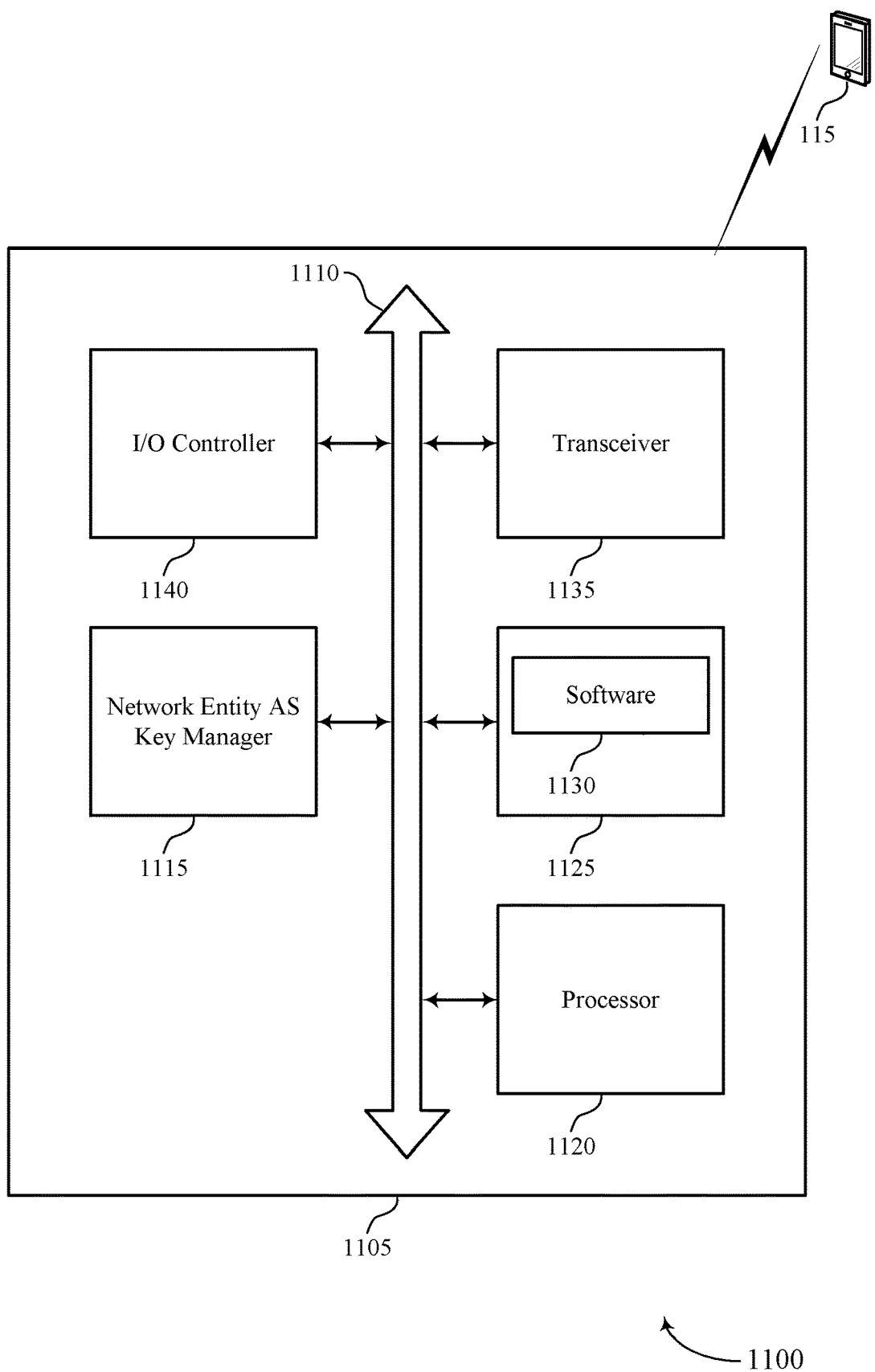
FIG. 11 illustrates a block diagram of a system including a network entity that supports security key derivation for handover in accordance with aspects of the present disclosure.

FIG. 11 shows a diagram of a system 1100 including a device 1105 that supports security key derivation for handover in accordance with aspects of the present disclosure. Device 1105 may be an example of or include the components of wireless device 805, wireless device 905, or a network entity 205 as described above, e.g., with reference to FIGS. 8 and 9. Device 1105 may include components for bi-directional voice and data communications including components for transmitting and receiving communications, including network entity AS key manager 1115, processor 1120, memory 1125, software 1130, transceiver 1135, and I/O controller 1140. These components may be in electronic communication via one or more buses (e.g., bus 1110).

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting security key derivation for handover).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support security key derivation for handover. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

I/O controller 1140 may manage input and output signals for device 1105. I/O controller 1140 may also manage peripherals not integrated into device 1105. In some cases, I/O controller 1140 may represent a physical connection or port to an external peripheral. In some cases, I/O controller 1140 may utilize an operating system such as iOS®, ANDROID®, MS-DOS®, MS-WINDOWS®, OS/2®, UNIX®, LINUX®, or another known operating system. In other cases, I/O controller 1140 may represent or interact with a modem, a keyboard, a mouse, a touchscreen, or a similar device. In some cases, I/O controller 1140 may be implemented as part of a processor. In some cases, a user may interact with device 1105 via I/O controller 1140 or via hardware components controlled by I/O controller 1140.

Figure 12:
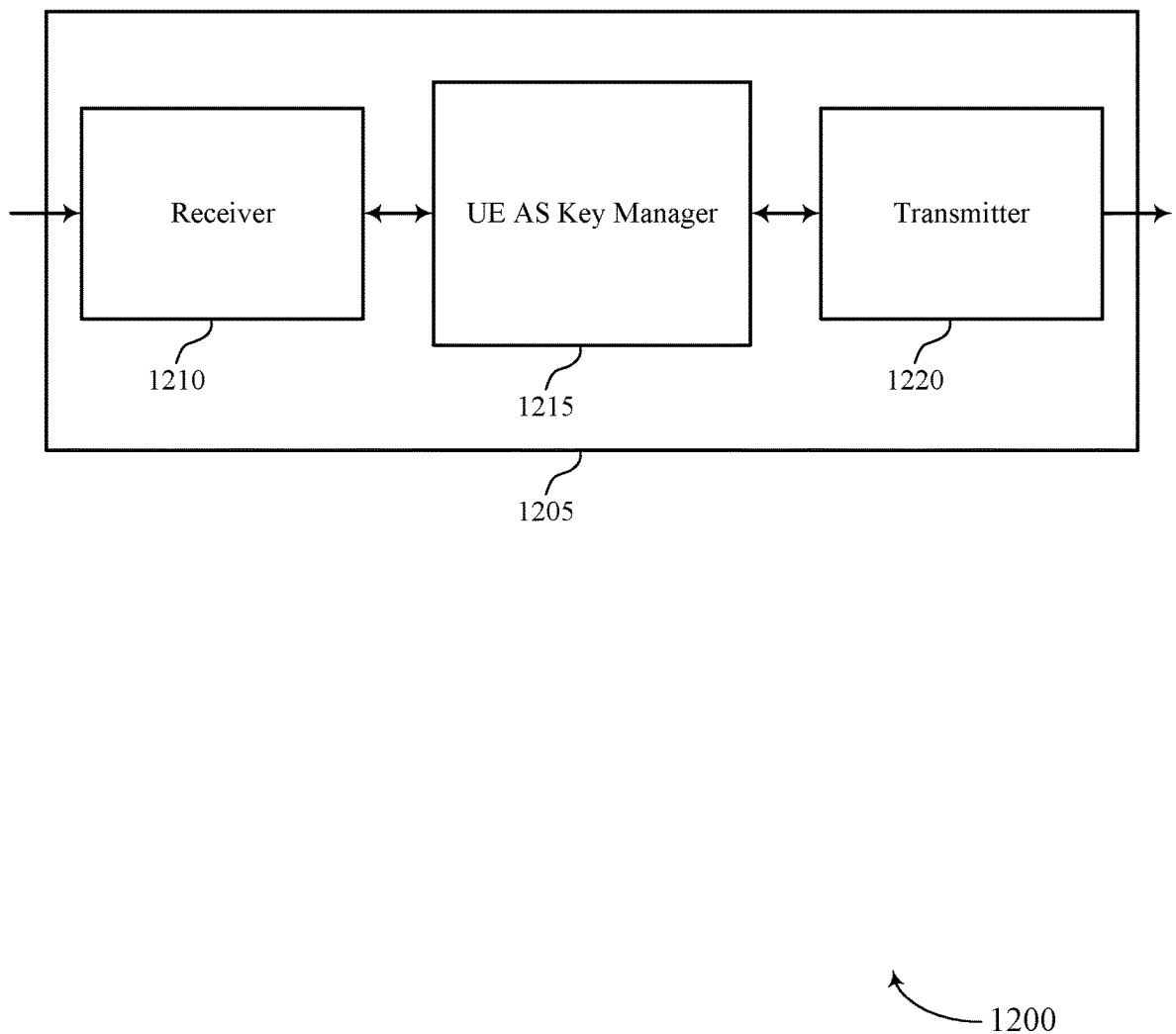
FIGS. 12 through 14 show block diagrams of a device that supports security key derivation for handover in accordance with aspects of the present disclosure.

FIG. 12 shows a block diagram 1200 of a wireless device 1205 that supports security key derivation for handover in accordance with aspects of the present disclosure. Wireless device 1205 may be an example of aspects of a UE 115 as described herein. Wireless device 1205 may include receiver 1210, UE AS key manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to security key derivation for handover, etc.). Information may be passed on to other components of the device. The receiver 1210 may be an example of aspects of the transceiver 1535 described with reference to FIG. 15. The receiver 1210 may utilize a single antenna or a set of antennas.

UE AS key manager 1215 may be an example of aspects of the UE AS key manager 1515 described with reference to FIG. 15.

UE AS key manager 1215 and/or at least some of its various sub-components may be implemented in hardware, software executed by a processor, firmware, or any combination thereof. If implemented in software executed by a processor, the functions of the UE AS key manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE AS key manager 1215 and/or at least some of its various sub-components may be physically located at various positions, including being distributed such that portions of functions are implemented at different physical locations by one or more physical devices.

In some examples, UE AS key manager 1215 and/or at least some of its various sub-components may be a separate and distinct component in accordance with various aspects of the present disclosure. In other examples, UE AS key manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE AS key manager 1215 may receive a handover command message from a source network entity that triggers a handover to a target network entity, receive an indication of a first freshness parameter, and generate a refreshed intermediate key based on the first freshness parameter and the handover command message, where the refreshed intermediate key is configured exclusively for generating a target base station base key.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Transmitter 1220 may communicate with a target base station based on the target base station base key.

Figure 13:
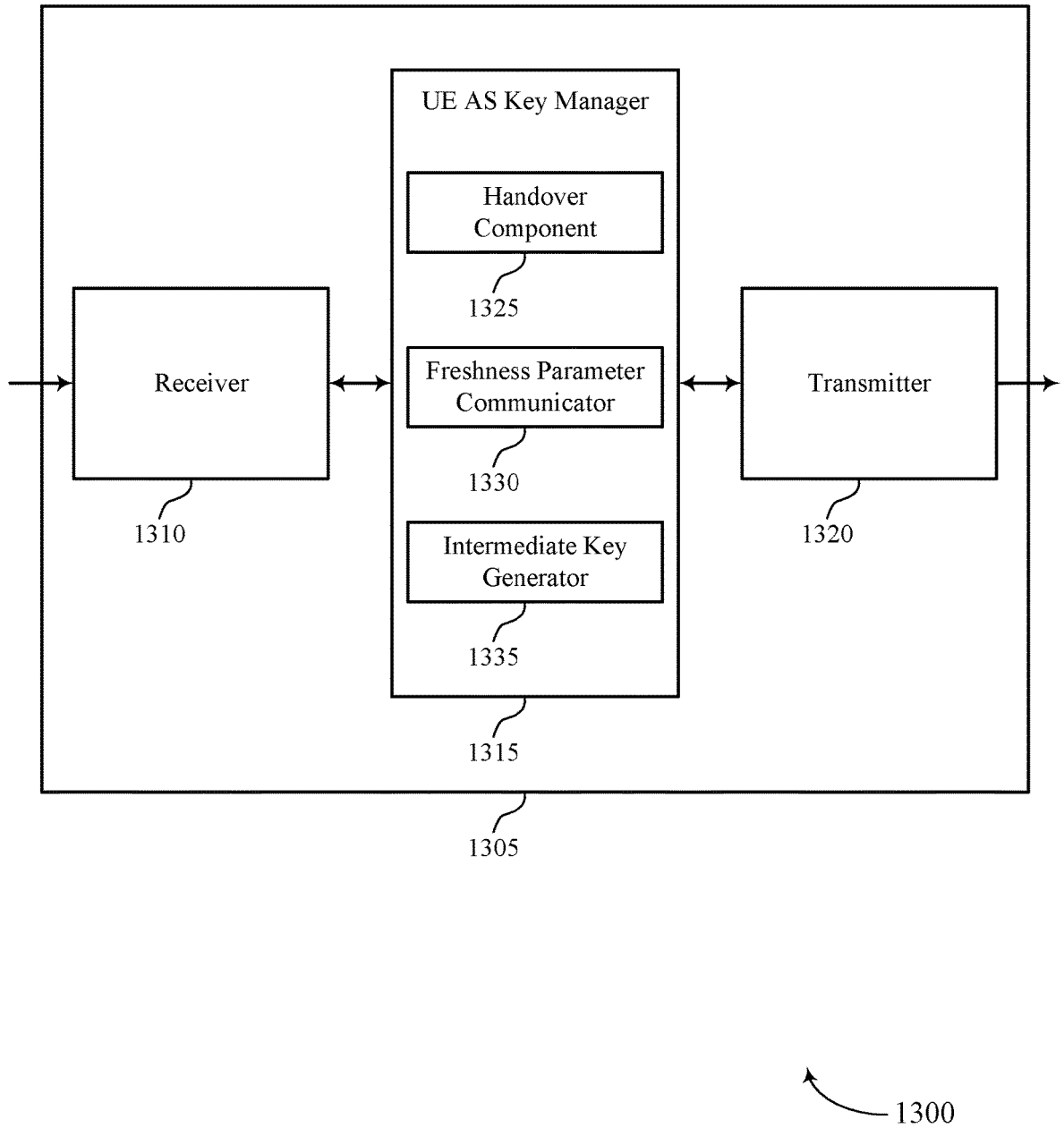

FIG. 13 shows a block diagram 1300 of a wireless device 1305 that supports security key derivation for handover in accordance with aspects of the present disclosure. Wireless device 1305 may be an example of aspects of a wireless device 1205 or a UE 115 as described with reference to FIG. 12. Wireless device 1305 may include receiver 1310, UE AS key manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to security key derivation for handover, etc.). Information may be passed on to other components of the device. The receiver 1310 may be an example of aspects of the transceiver 1535 described with reference to FIG. 15. The receiver 1310 may utilize a single antenna or a set of antennas.

UE AS key manager 1315 may be an example of aspects of the UE AS key manager 1515 described with reference to FIG. 15. UE AS key manager 1315 may also include handover component 1325, freshness parameter communicator 1330, and intermediate key generator 1335.

Handover component 1325 may receive a handover command message from a source network entity that triggers a handover to a target network entity. In some cases, the source network entity includes a source AMF and the target network entity includes a target AMF.

Freshness parameter communicator 1330 may receive an indication of a first freshness parameter, receive an indication of a second freshness parameter, receive an indication of an updated second freshness parameter, and receive an indication of an updated first freshness parameter. In some cases, the first freshness parameter includes an uplink NAS count, a downlink NAS count, a counter reserved for refreshing an intermediate key at the source network entity, or a combination thereof.

Intermediate key generator 1335 may generate a refreshed intermediate key based on the first freshness parameter and the handover command message, where the refreshed intermediate key is configured exclusively for generating a target base station base key. In some examples, intermediate key generator 1335 may generate an intermediate key based on a network entity base key, where the intermediate key is different from the refreshed intermediate key, and receive an indication that the refreshed intermediate key is configured exclusively for generating the target base station base key.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
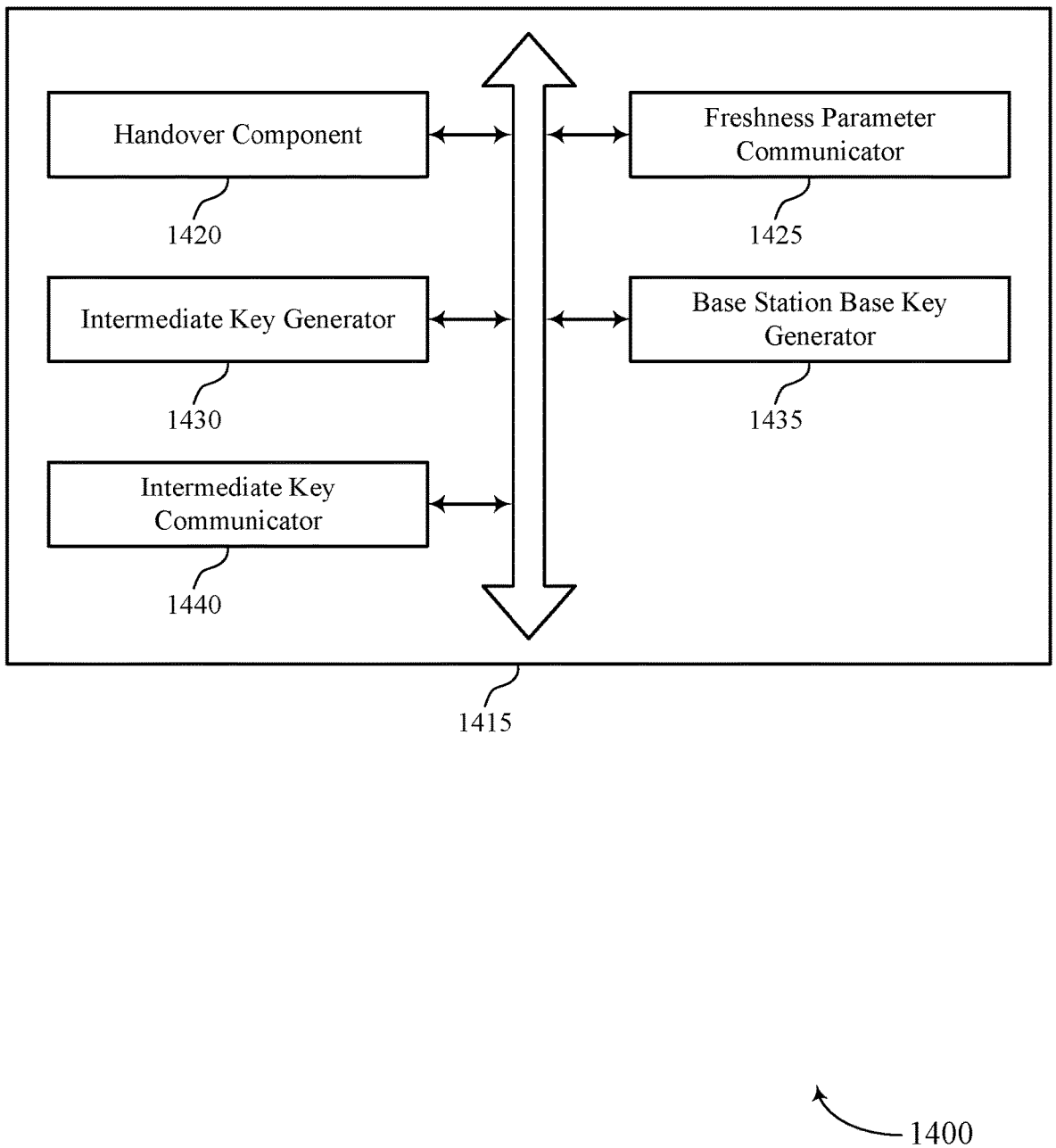

FIG. 14 shows a block diagram 1400 of a UE AS key manager 1415 that supports security key derivation for handover in accordance with aspects of the present disclosure. The UE AS key manager 1415 may be an example of aspects of a UE AS key manager 1515 described with reference to FIGS. 12, 13, and 15. The UE AS key manager 1415 may include handover component 1420, freshness parameter communicator 1425, intermediate key generator 1430, base station base key generator 1435, and intermediate key communicator 1440. Each of these modules may communicate, directly or indirectly, with one another (e.g., via one or more buses).

Handover component 1420 may receive a handover command message from a source network entity that triggers a handover to a target network entity. In some cases, the source network entity includes a source AMF and the target network entity includes a target AMF.

Freshness parameter communicator 1425 may receive an indication of a first freshness parameter and receive an indication of a second freshness parameter. Freshness parameter communicator 1425 may receive an indication of an updated second freshness parameter and receive an indication of an updated first freshness parameter. In some cases, the first freshness parameter includes an uplink NAS count, a downlink NAS count, a counter reserved for refreshing an intermediate key at the source network entity, or a combination thereof.

Intermediate key generator 1430 may generate a refreshed intermediate key based on the first freshness parameter and the handover command message, where the refreshed intermediate key is configured exclusively for generating a target base station base key. Intermediate key generator 1430 may generate an intermediate key based on a network entity base key, where the intermediate key is different from the refreshed intermediate key and receive an indication that the refreshed intermediate key is configured exclusively for generating the target base station base key.

Base station base key generator 1435 may generate the target base station base key based on the refreshed intermediate key and the second freshness parameter and refresh the target base station base key based on the updated second freshness parameter. Base station base key generator 1435 may refresh the target base station base key based on the updated refreshed intermediate key and refresh the target base station base key based on the updated first freshness parameter. In some cases, the second freshness parameter includes a counter reserved for refreshing the target base station base key.

Intermediate key communicator 1440 may receive an indication of an updated refreshed intermediate key.

Figure 15:
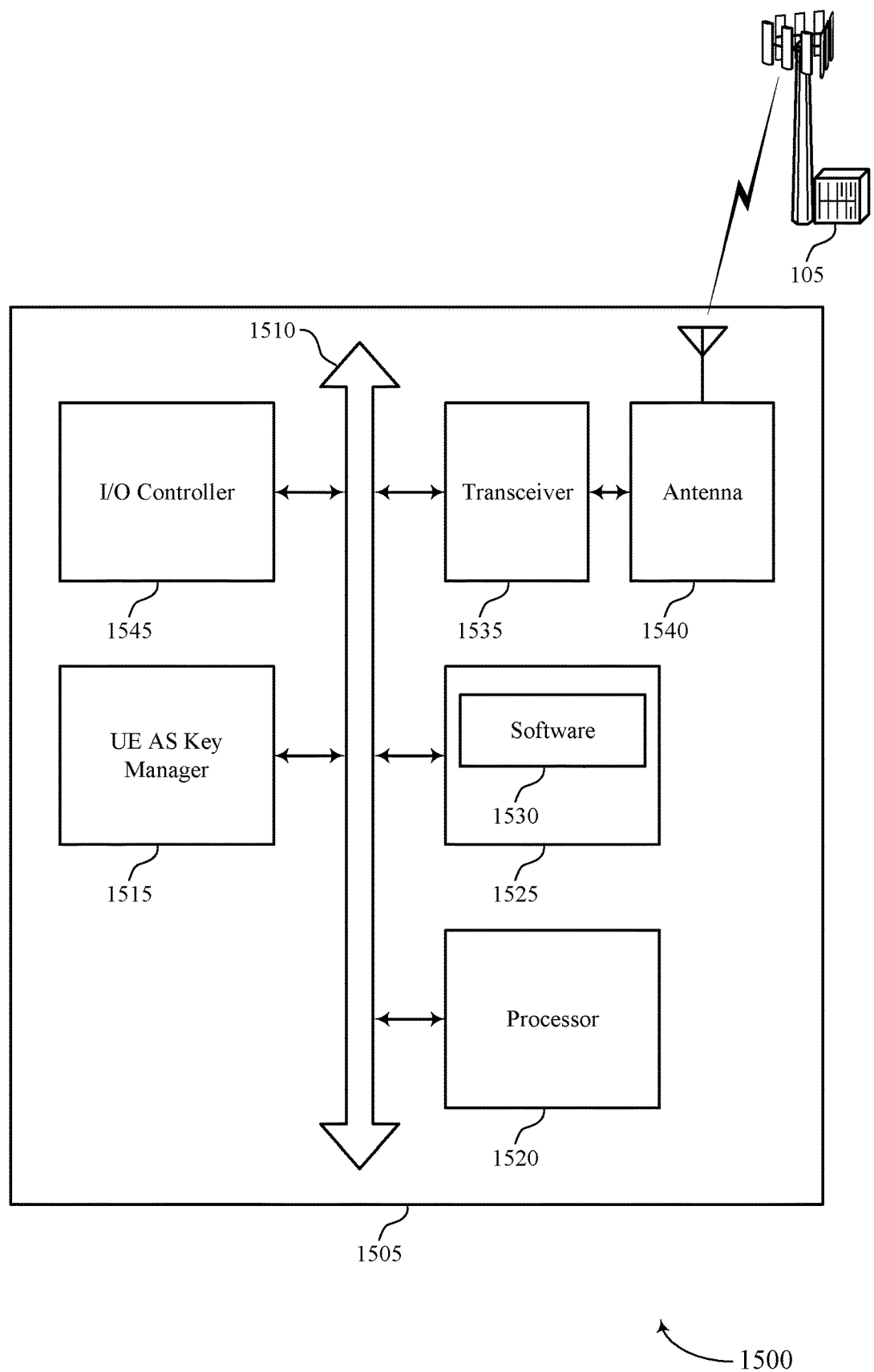
FIG. 15 illustrates a block diagram of a system including a UE that supports security key derivation for handover in accordance with aspects of the present disclosure.

FIG. 15 shows a diagram of a system 1500 including a device 1505 that supports security key derivation for handover in accordance with aspects of the present disclosure. Device 1505 may be an example of or include the components of UE 115 as described above, e.g., with reference to FIG. 1. Device 1505 may include components for bi-directional voice and data communications including components for transmitting and receiving communications, including UE AS key manager 1515, processor 1520, memory 1525, software 1530, transceiver 1535, antenna 1540, and I/O controller 1545. These components may be in electronic communication via one or more buses (e.g., bus 1510). Device 1505 may communicate wirelessly with one or more base stations 105.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting security key derivation for handover).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support security key derivation for handover. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system. In other cases, I/O controller 1545 may represent or interact with a modem, a keyboard, a mouse, a touchscreen, or a similar device. In some cases, I/O controller 1545 may be implemented as part of a processor. In some cases, a user may interact with device 1505 via I/O controller 1545 or via hardware components controlled by I/O controller 1545.

Figure 16:
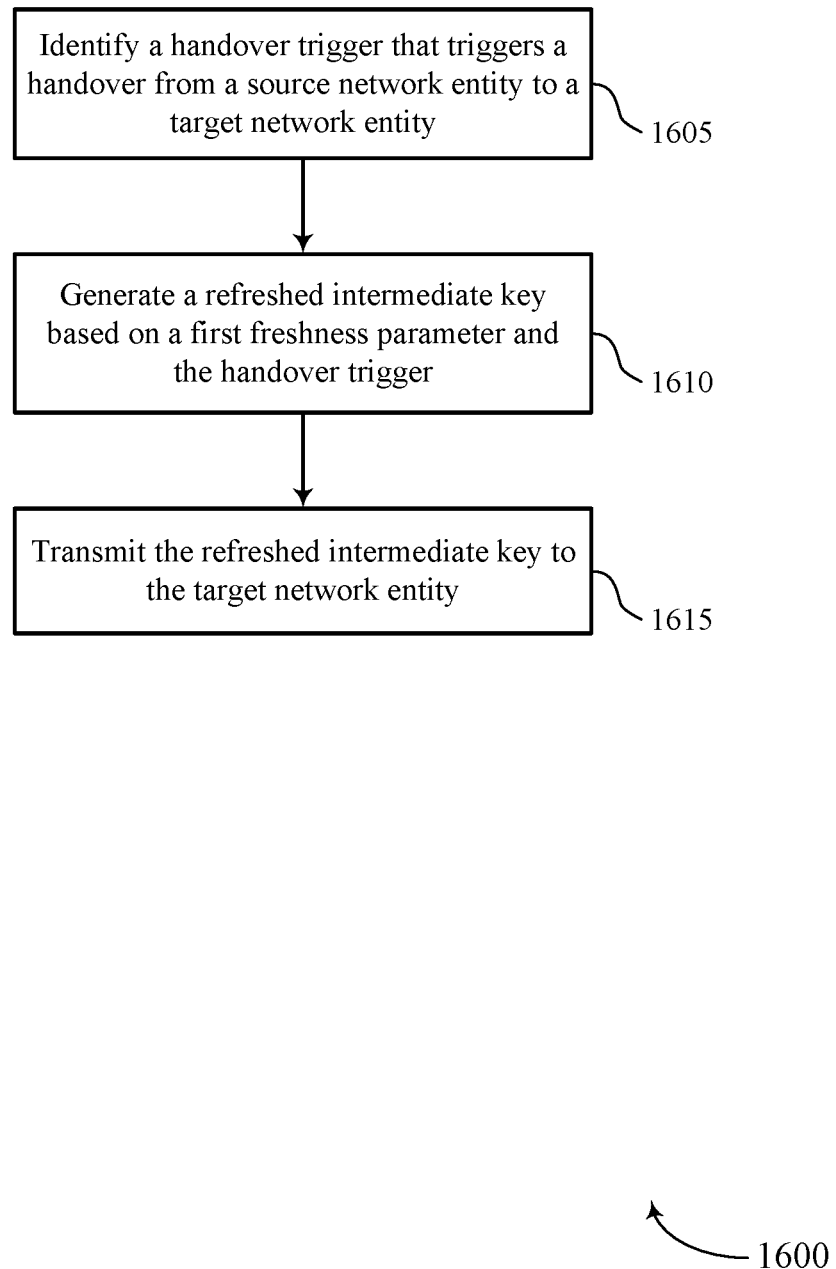
FIGS. 16 through 24 illustrate methods for security key derivation for handover in accordance with aspects of the present disclosure.

FIG. 16 shows a flowchart illustrating a method 1600 for security key derivation for handover in accordance with aspects of the present disclosure. The operations of method 1600 may be implemented by a network entity 205 (e.g., an AMF) or its components as described herein. For example, the operations of method 1600 may be performed by a network entity AS key manager as described with reference to FIGS. 8 through 11. In some examples, a network entity 205 may execute a set of codes to control the functional elements of the device to perform the functions described below. Additionally or alternatively, the network entity 205 may perform aspects of the functions described below using special-purpose hardware.

At block 1605 the network entity 205 may identify a handover trigger that triggers a handover from a source network entity to a target network entity. As described herein, the source network entity may be a source AMF, and the target network entity may be a target AMF. The operations of block 1605 may be performed according to the methods described herein. In certain examples, aspects of the operations of block 1605 may be performed by a handover component as described with reference to FIGS. 8 through 11.

At block 1610 the network entity 205 may generate a refreshed intermediate key based at least in part on a first freshness parameter and the handover trigger. The operations of block 1610 may be performed according to the methods described herein. In certain examples, aspects of the operations of block 1610 may be performed by an intermediate key generator as described with reference to FIGS. 8 through 11.

At block 1615 the network entity 205 may transmit the refreshed intermediate key to the target network entity. The operations of block 1615 may be performed according to the methods described herein. In certain examples, aspects of the operations of block 1615 may be performed by an intermediate key communicator as described with reference to FIGS. 8 through 11.

Figure 17:
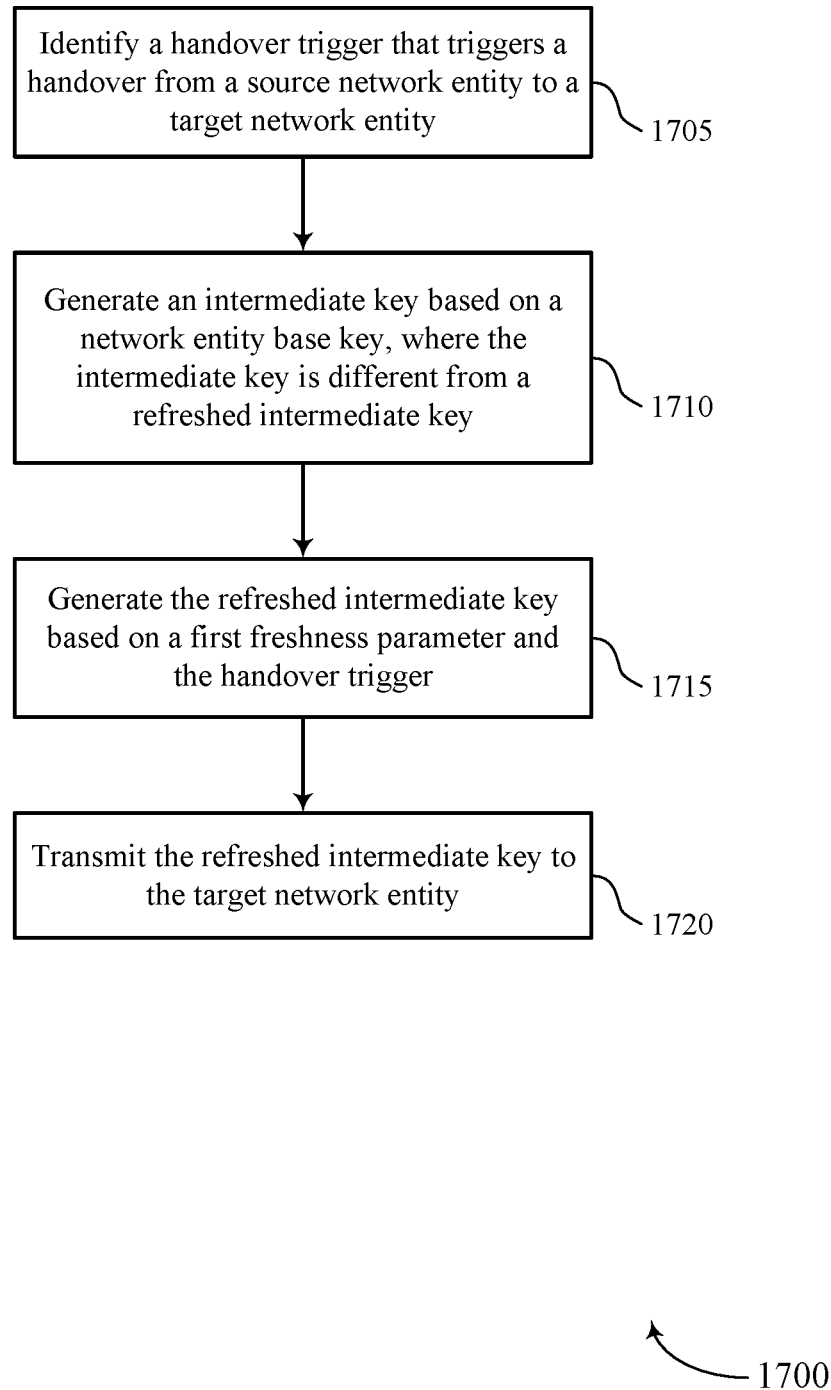

FIG. 17 shows a flowchart illustrating a method 1700 for security key derivation for handover in accordance with aspects of the present disclosure. The operations of method 1700 may be implemented by a network entity 205 (e.g., an AMF) or its components as described herein. For example, the operations of method 1700 may be performed by a network entity AS key manager as described with reference to FIGS. 8 through 11. In some examples, a network entity 205 may execute a set of codes to control the functional elements of the device to perform the functions described below. Additionally or alternatively, the network entity 205 may perform aspects of the functions described below using special-purpose hardware.

At block 1705 the network entity 205 may identify a handover trigger that triggers a handover from a source network entity to a target network entity. The operations of block 1705 may be performed according to the methods described herein. In certain examples, aspects of the operations of block 1705 may be performed by a handover component as described with reference to FIGS. 8 through 11.

At block 1710 the network entity 205 may generate an intermediate key based at least in part on a network entity base key, wherein the intermediate key is different from the refreshed intermediate key. The operations of block 1710 may be performed according to the methods described herein. In certain examples, aspects of the operations of block 1710 may be performed by an intermediate key generator as described with reference to FIGS. 8 through 11.

At block 1715 the network entity 205 may generate a refreshed intermediate key based at least in part on a first freshness parameter and the handover trigger. The operations of block 1715 may be performed according to the methods described herein. In certain examples, aspects of the operations of block 1715 may be performed by an intermediate key generator as described with reference to FIGS. 8 through 11.

At block 1720 the network entity 205 may transmit the refreshed intermediate key to the target network entity. The operations of block 1720 may be performed according to the methods described herein. In certain examples, aspects of the operations of block 1720 may be performed by an intermediate key communicator as described with reference to FIGS. 8 through 11.

Figure 18:
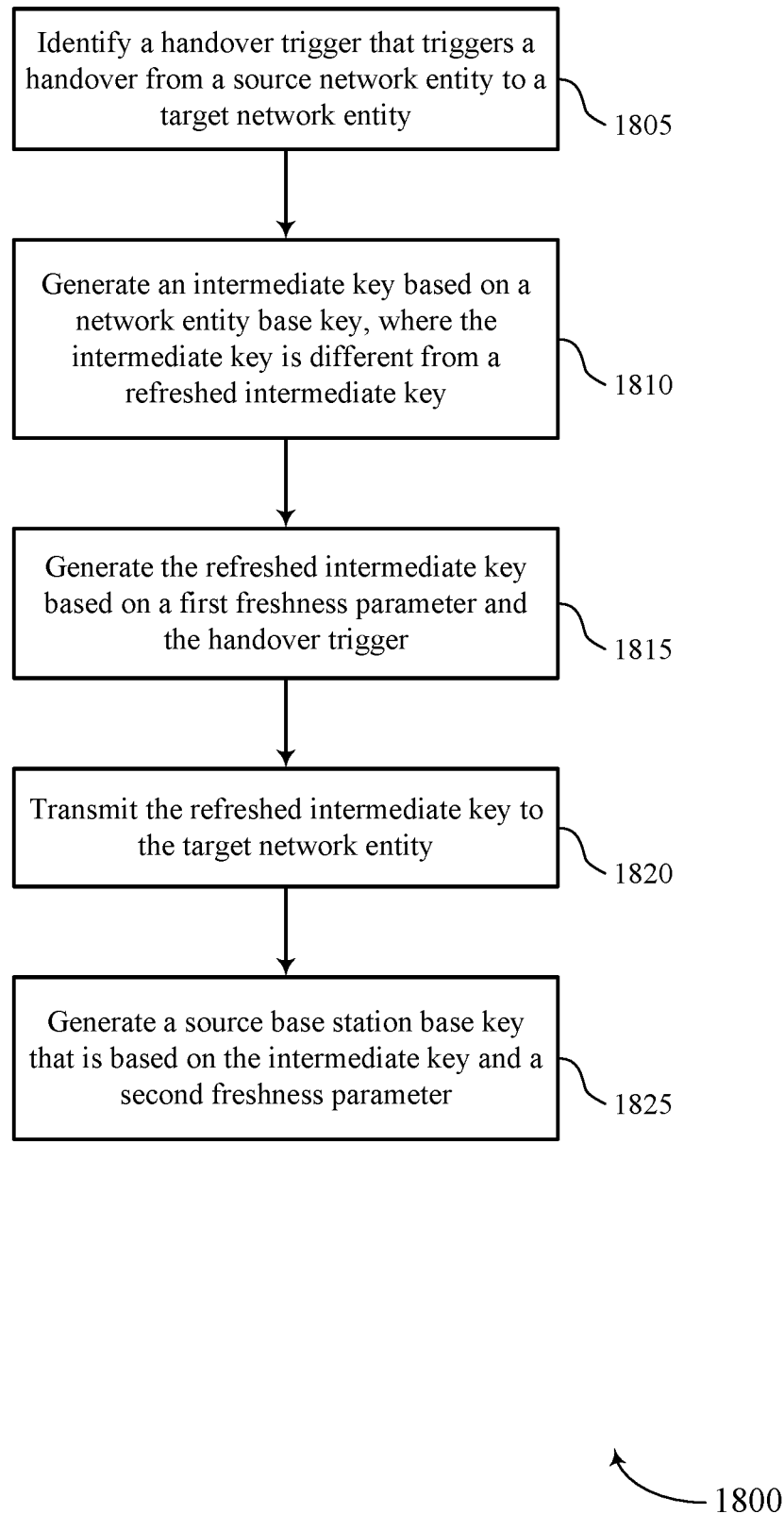

FIG. 18 shows a flowchart illustrating a method 1800 for security key derivation for handover in accordance with aspects of the present disclosure. The operations of method 1800 may be implemented by a network entity 205 (e.g., an AMF) or its components as described herein. For example, the operations of method 1800 may be performed by a network entity AS key manager as described with reference to FIGS. 8 through 11. In some examples, a network entity 205 may execute a set of codes to control the functional elements of the device to perform the functions described below. Additionally or alternatively, the network entity 205 may perform aspects of the functions described below using special-purpose hardware.

At block 1805 the network entity 205 may identify a handover trigger that triggers a handover from a source network entity to a target network entity. The operations of block 1805 may be performed according to the methods described herein. In certain examples, aspects of the operations of block 1805 may be performed by a handover component as described with reference to FIGS. 8 through 11.

At block 1810 the network entity 205 may generate an intermediate key based at least in part on a network entity base key, wherein the intermediate key is different from the refreshed intermediate key. The operations of block 1810 may be performed according to the methods described herein. In certain examples, aspects of the operations of block 1810 may be performed by an intermediate key generator as described with reference to FIGS. 8 through 11.

At block 1815 the network entity 205 may generate a refreshed intermediate key based at least in part on a first freshness parameter and the handover trigger. The operations of block 1815 may be performed according to the methods described herein. In certain examples, aspects of the operations of block 1815 may be performed by an intermediate key generator as described with reference to FIGS. 8 through 11.

At block 1820 the network entity 205 may transmit the refreshed intermediate key to the target network entity. The operations of block 1820 may be performed according to the methods described herein. In certain examples, aspects of the operations of block 1820 may be performed by an intermediate key communicator as described with reference to FIGS. 8 through 11.

At block 1825 the network entity 205 may generate a source base station base key that is based at least in part on the intermediate key and a second freshness parameter. The operations of block 1825 may be performed according to the methods described herein. In certain examples, aspects of the operations of block 1825 may be performed by a base station base key generator as described with reference to FIGS. 8 through 11.

Figure 19:
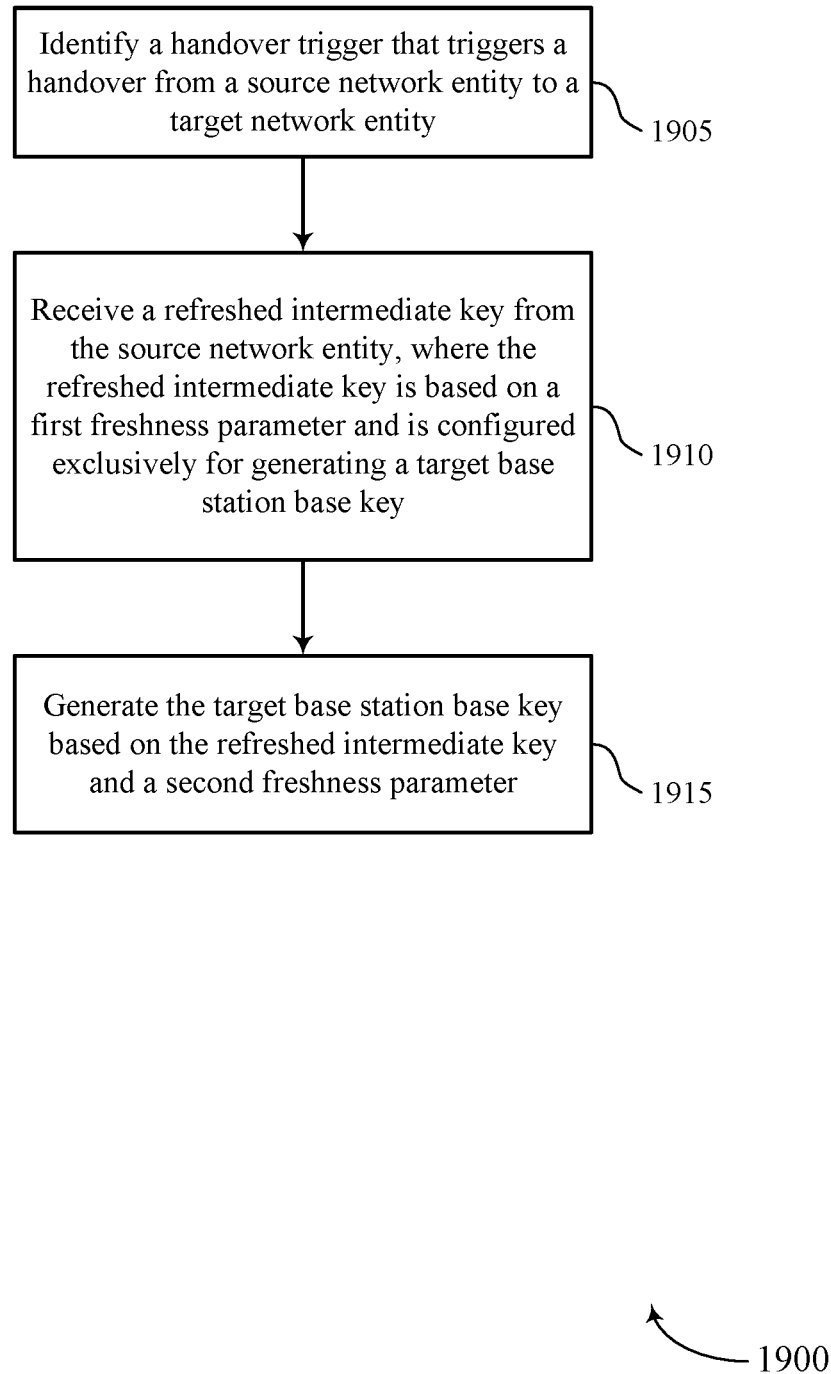

FIG. 19 shows a flowchart illustrating a method 1900 for security key derivation for handover in accordance with aspects of the present disclosure. The operations of method 1900 may be implemented by a network entity 205 (e.g., an AMF) or its components as described herein. For example, the operations of method 1900 may be performed by a network entity AS key manager as described with reference to FIGS. 8 through 11. In some examples, a network entity 205 may execute a set of codes to control the functional elements of the device to perform the functions described below. Additionally or alternatively, the network entity 205 may perform aspects of the functions described below using special-purpose hardware.

At block 1905 the network entity 205 may identify a handover trigger that triggers a handover from a source network entity to a target network entity. The operations of block 1905 may be performed according to the methods described herein. In certain examples, aspects of the operations of block 1905 may be performed by a handover component as described with reference to FIGS. 8 through 11.

At block 1910 the network entity 205 may receive a refreshed intermediate key from the source network entity, wherein the refreshed intermediate key is based at least in part on a first freshness parameter and is configured exclusively for generating a target base station base key. The operations of block 1910 may be performed according to the methods described herein. In certain examples, aspects of the operations of block 1910 may be performed by an intermediate key communicator as described with reference to FIGS. 8 through 11.

At block 1915 the network entity 205 may generate the target base station base key based at least in part on the refreshed intermediate key and a second freshness parameter. The operations of block 1915 may be performed according to the methods described herein. In certain examples, aspects of the operations of block 1915 may be performed by a base station base key generator as described with reference to FIGS. 8 through 11.

Figure 20:
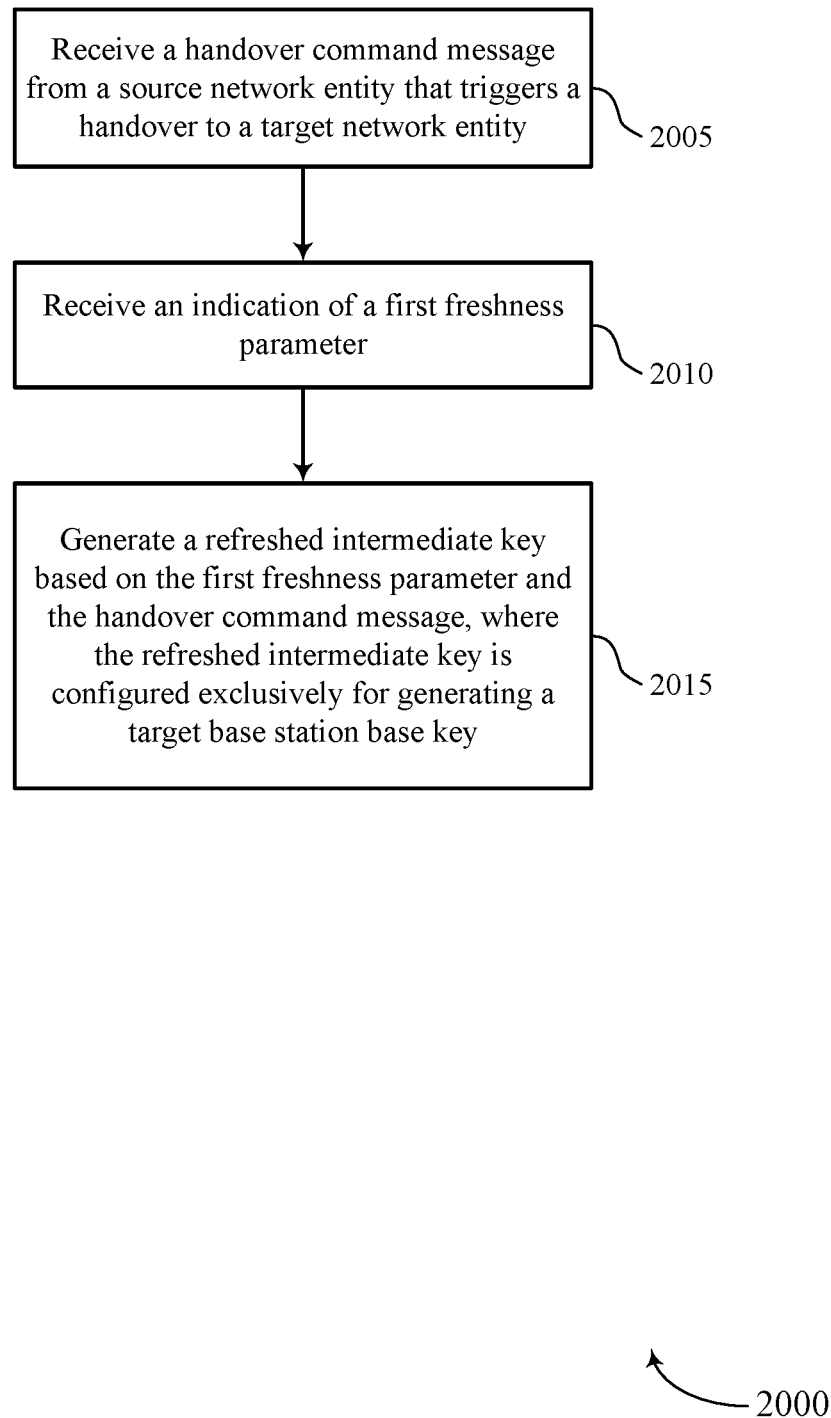

FIG. 20 shows a flowchart illustrating a method 2000 for security key derivation for handover in accordance with aspects of the present disclosure. The operations of method 2000 may be implemented by a UE 115 or its components as described herein. For example, the operations of method 2000 may be performed by a UE AS key manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may receive a handover command message from a source network entity that triggers a handover to a target network entity. The operations of block 2005 may be performed according to the methods described herein. In certain examples, aspects of the operations of block 2005 may be performed by a handover component as described with reference to FIGS. 12 through 15.

At block 2010 the UE 115 may receive an indication of a first freshness parameter. The operations of block 2010 may be performed according to the methods described herein. In certain examples, aspects of the operations of block 2010 may be performed by a freshness parameter communicator as described with reference to FIGS. 12 through 15.

At block 2015 the UE 115 may generate a refreshed intermediate key based at least in part on the first freshness parameter and the handover command message, wherein the refreshed intermediate key is configured exclusively for generating a target base station base key. The operations of block 2015 may be performed according to the methods described herein. In certain examples, aspects of the operations of block 2015 may be performed by an intermediate key generator as described with reference to FIGS. 12 through 15.

Figure 21:
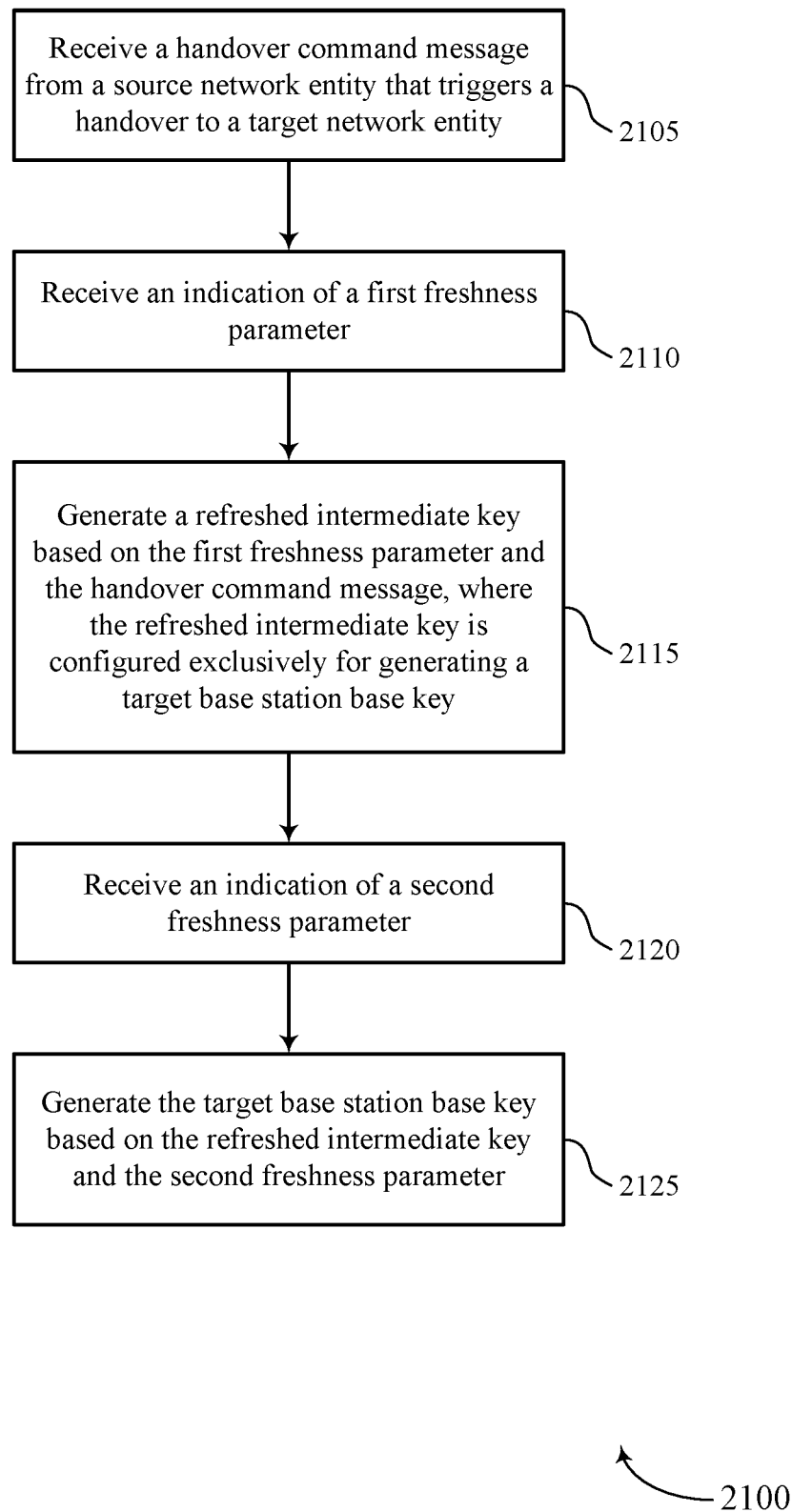

FIG. 21 shows a flowchart illustrating a method 2100 for security key derivation for handover in accordance with aspects of the present disclosure. The operations of method 2100 may be implemented by a UE 115 or its components as described herein. For example, the operations of method 2100 may be performed by a UE AS key manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive a handover command message from a source network entity that triggers a handover to a target network entity. The operations of block 2105 may be performed according to the methods described herein. In certain examples, aspects of the operations of block 2105 may be performed by a handover component as described with reference to FIGS. 12 through 15.

At block 2110 the UE 115 may receive an indication of a first freshness parameter. The operations of block 2110 may be performed according to the methods described herein. In certain examples, aspects of the operations of block 2110 may be performed by a freshness parameter communicator as described with reference to FIGS. 12 through 15.

At block 2115 the UE 115 may generate a refreshed intermediate key based at least in part on the first freshness parameter and the handover command message, wherein the refreshed intermediate key is configured exclusively for generating a target base station base key. The operations of block 2115 may be performed according to the methods described herein. In certain examples, aspects of the operations of block 2115 may be performed by an intermediate key generator as described with reference to FIGS. 12 through 15.

At block 2120 the UE 115 may receive an indication of a second freshness parameter. The operations of block 2120 may be performed according to the methods described herein. In certain examples, aspects of the operations of block 2120 may be performed by a freshness parameter communicator as described with reference to FIGS. 12 through 15.

At block 2125 the UE 115 may generate the target base station base key based at least in part on the refreshed intermediate key and the second freshness parameter. The operations of block 2125 may be performed according to the methods described herein. In certain examples, aspects of the operations of block 2125 may be performed by a base station base key generator as described with reference to FIGS. 12 through 15.

Figure 22:
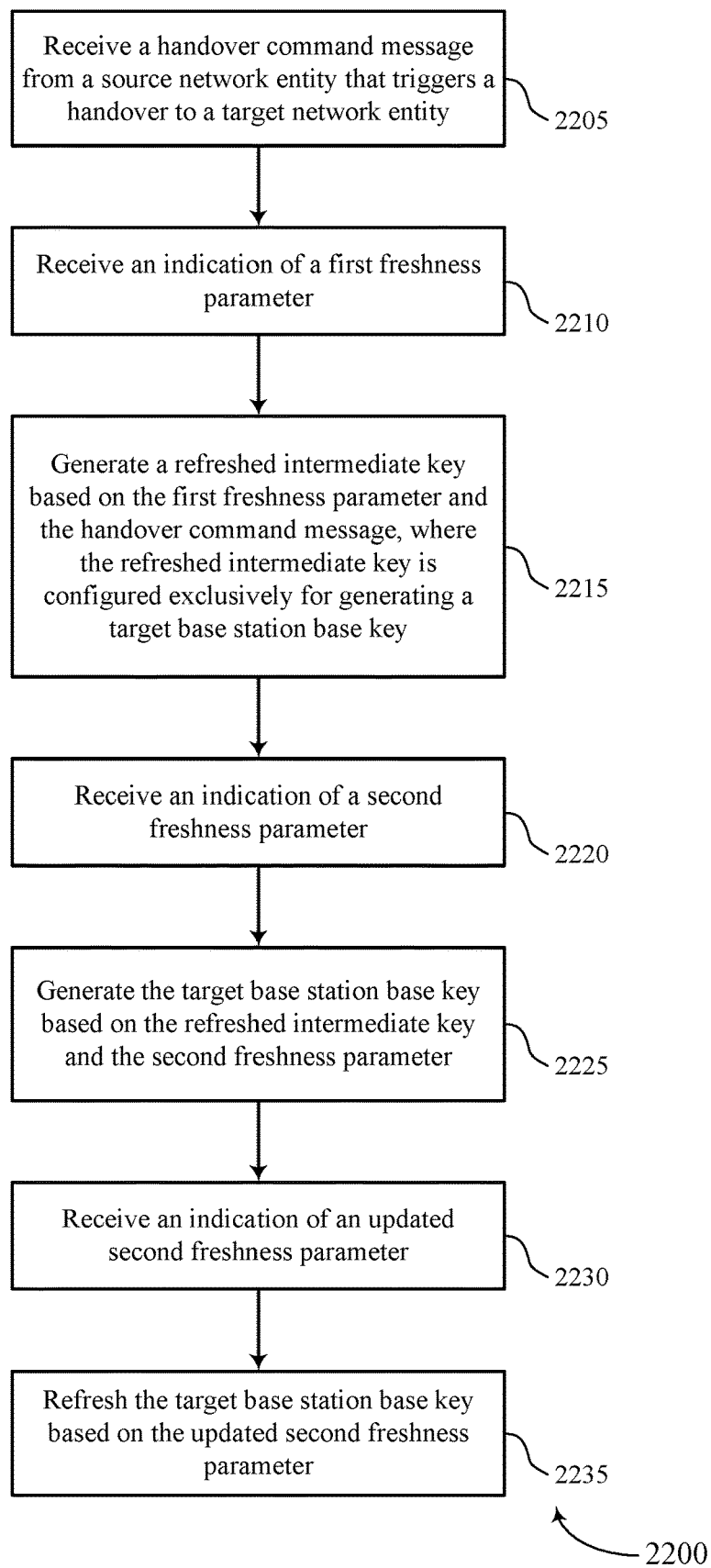

FIG. 22 shows a flowchart illustrating a method 2200 for security key derivation for handover in accordance with aspects of the present disclosure. The operations of method 2200 may be implemented by a UE 115 or its components as described herein. For example, the operations of method 2200 may be performed by a UE AS key manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2205 the UE 115 may receive a handover command message from a source network entity that triggers a handover to a target network entity. The operations of block 2205 may be performed according to the methods described herein. In certain examples, aspects of the operations of block 2205 may be performed by a handover component as described with reference to FIGS. 12 through 15.

At block 2210 the UE 115 may receive an indication of a first freshness parameter. The operations of block 2210 may be performed according to the methods described herein. In certain examples, aspects of the operations of block 2210 may be performed by a freshness parameter communicator as described with reference to FIGS. 12 through 15.

At block 2215 the UE 115 may generate a refreshed intermediate key based at least in part on the first freshness parameter and the handover command message, wherein the refreshed intermediate key is configured exclusively for generating a target base station base key. The operations of block 2215 may be performed according to the methods described herein. In certain examples, aspects of the operations of block 2215 may be performed by an intermediate key generator as described with reference to FIGS. 12 through 15.

At block 2220 the UE 115 may receive an indication of a second freshness parameter. The operations of block 2220 may be performed according to the methods described herein. In certain examples, aspects of the operations of block 2220 may be performed by a freshness parameter communicator as described with reference to FIGS. 12 through 15.

At block 2225 the UE 115 may generate the target base station base key based at least in part on the refreshed intermediate key and the second freshness parameter. The operations of block 2225 may be performed according to the methods described herein. In certain examples, aspects of the operations of block 2225 may be performed by a base station base key generator as described with reference to FIGS. 12 through 15.

At block 2230 the UE 115 may receive an indication of an updated second freshness parameter. The operations of block 2230 may be performed according to the methods described herein. In certain examples, aspects of the operations of block 2230 may be performed by a freshness parameter communicator as described with reference to FIGS. 12 through 15.

At block 2235 the UE 115 may refresh the target base station base key based at least in part on the updated second freshness parameter. The operations of block 2235 may be performed according to the methods described herein. In certain examples, aspects of the operations of block 2235 may be performed by a base station base key generator as described with reference to FIGS. 12 through 15.

Figure 23:
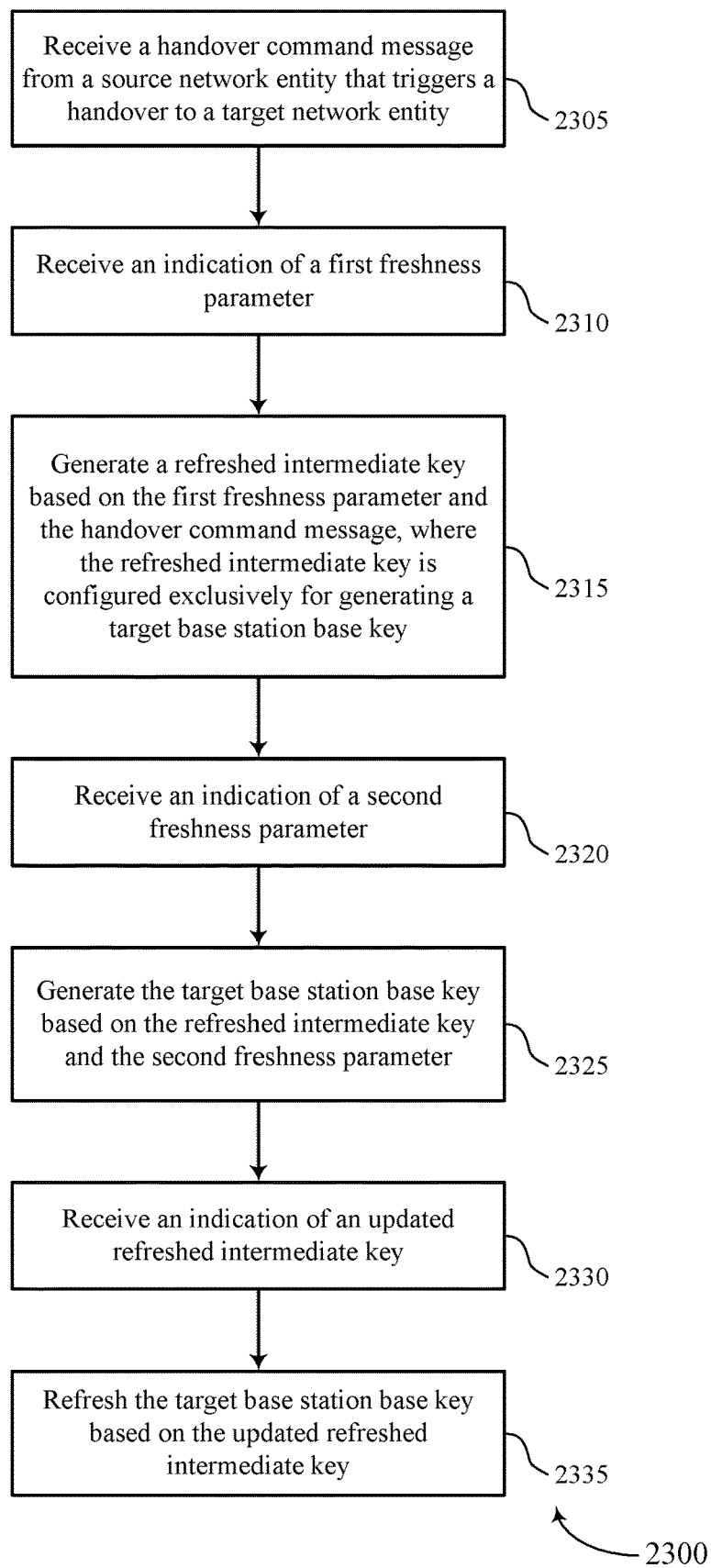

FIG. 23 shows a flowchart illustrating a method 2300 for security key derivation for handover in accordance with aspects of the present disclosure. The operations of method 2300 may be implemented by a UE 115 or its components as described herein. For example, the operations of method 2300 may be performed by a UE AS key manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2305 the UE 115 may receive a handover command message from a source network entity that triggers a handover to a target network entity. The operations of block 2305 may be performed according to the methods described herein. In certain examples, aspects of the operations of block 2305 may be performed by a handover component as described with reference to FIGS. 12 through 15.

At block 2310 the UE 115 may receive an indication of a first freshness parameter. The operations of block 2310 may be performed according to the methods described herein. In certain examples, aspects of the operations of block 2310 may be performed by a freshness parameter communicator as described with reference to FIGS. 12 through 15.

At block 2315 the UE 115 may generate a refreshed intermediate key based at least in part on the first freshness parameter and the handover command message, wherein the refreshed intermediate key is configured exclusively for generating a target base station base key. The operations of block 2315 may be performed according to the methods described herein. In certain examples, aspects of the operations of block 2315 may be performed by an intermediate key generator as described with reference to FIGS. 12 through 15.

At block 2320 the UE 115 may receive an indication of a second freshness parameter. The operations of block 2320 may be performed according to the methods described herein. In certain examples, aspects of the operations of block 2320 may be performed by a freshness parameter communicator as described with reference to FIGS. 12 through 15.

At block 2325 the UE 115 may generate the target base station base key based at least in part on the refreshed intermediate key and the second freshness parameter. The operations of block 2325 may be performed according to the methods described herein. In certain examples, aspects of the operations of block 2325 may be performed by a base station base key generator as described with reference to FIGS. 12 through 15.

At block 2330 the UE 115 may receive an indication of an updated refreshed intermediate key. The operations of block 2330 may be performed according to the methods described herein. In certain examples, aspects of the operations of block 2330 may be performed by an intermediate key communicator as described with reference to FIGS. 12 through 15.

At block 2335 the UE 115 may refresh the target base station base key based at least in part on the updated refreshed intermediate key. The operations of block 2335 may be performed according to the methods described herein. In certain examples, aspects of the operations of block 2335 may be performed by a base station base key generator as described with reference to FIGS. 12 through 15.

Figure 24:
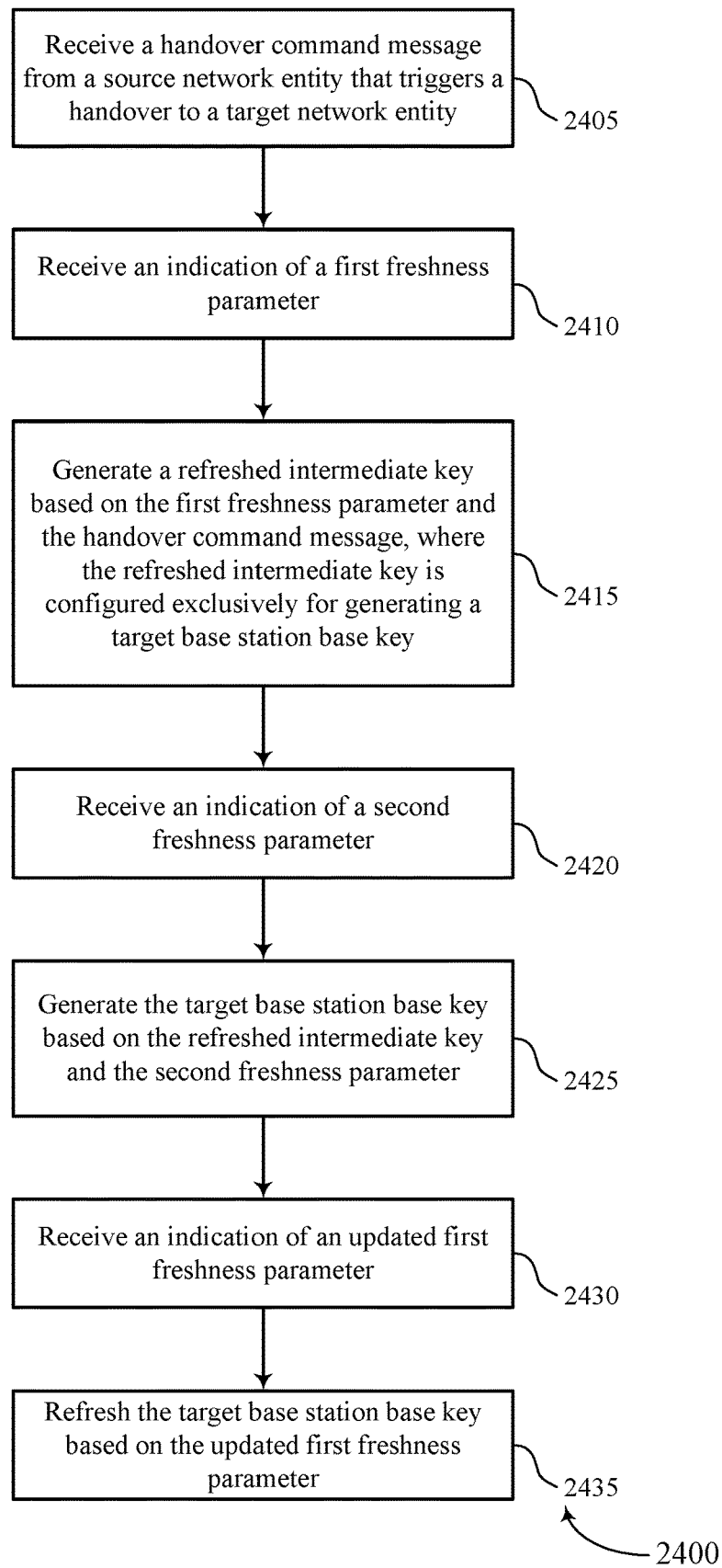

FIG. 24 shows a flowchart illustrating a method 2400 for security key derivation for handover in accordance with aspects of the present disclosure. The operations of method 2400 may be implemented by a UE 115 or its components as described herein. For example, the operations of method 2400 may be performed by a UE AS key manager as described with reference to FIGS. 12 through 15. In some examples, a UE 115 may execute a set of codes to control the functional elements of the device to perform the functions described below. Additionally or alternatively, the UE 115 may perform aspects of the functions described below using special-purpose hardware.

At block 2405 the UE 115 may receive a handover command message from a source network entity that triggers a handover to a target network entity. The operations of block 2405 may be performed according to the methods described herein. In certain examples, aspects of the operations of block 2405 may be performed by a handover component as described with reference to FIGS. 12 through 15.

At block 2410 the UE 115 may receive an indication of a first freshness parameter. The operations of block 2410 may be performed according to the methods described herein. In certain examples, aspects of the operations of block 2410 may be performed by a freshness parameter communicator as described with reference to FIGS. 12 through 15.

At block 2415 the UE 115 may generate a refreshed intermediate key based at least in part on the first freshness parameter and the handover command message, wherein the refreshed intermediate key is configured exclusively for generating a target base station base key. The operations of block 2415 may be performed according to the methods described herein. In certain examples, aspects of the operations of block 2415 may be performed by an intermediate key generator as described with reference to FIGS. 12 through 15.

At block 2420 the UE 115 may receive an indication of a second freshness parameter. The operations of block 2420 may be performed according to the methods described herein. In certain examples, aspects of the operations of block 2420 may be performed by a freshness parameter communicator as described with reference to FIGS. 12 through 15.

At block 2425 the UE 115 may generate the target base station base key based at least in part on the refreshed intermediate key and the second freshness parameter. The operations of block 2425 may be performed according to the methods described herein. In certain examples, aspects of the operations of block 2425 may be performed by a base station base key generator as described with reference to FIGS. 12 through 15.

At block 2430 the UE 115 may receive an indication of an updated first freshness parameter. The operations of block 2430 may be performed according to the methods described herein. In certain examples, aspects of the operations of block 2430 may be performed by a freshness parameter communicator as described with reference to FIGS. 12 through 15.

At block 2435 the UE 115 may refresh the target base station base key based at least in part on the updated first freshness parameter. The operations of block 2435 may be performed according to the methods described herein. In certain examples, aspects of the operations of block 2435 may be performed by a base station base key generator as described with reference to FIGS. 12 through 15.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a source access and mobility function (AMF), comprising:
   identifying a handover trigger that triggers a handover from the source AMF to a target AMF;
   in response to the handover trigger, generating an AMF base key based at least in part on inputting a downlink non-access stratum (NAS) count into a key derivation function;
   generating a target base station base key based at least in part on inputting the AMF base key and an uplink NAS count into the key derivation function; and
   transmitting, by the source AMF to the target AMF, both of the AMF base key and the target base station base key, wherein the AMF base key is different from the target base station base key.

2. The method of claim 1, further comprising:
   generating an intermediate key based at least in part on a network entity base key, wherein the intermediate key is different from the AMF base key.

3. The method of claim 2, further comprising:
   generating a source base station base key based at least in part on the intermediate key and a counter reserved for refreshing the source base station base key.

4. The method of claim 3, further comprising:
   transmitting the source base station base key to a source base station.

5. The method of claim 3, further comprising:
   generating a refreshed source base station base key based at least in part on the counter reserved for refreshing the source base station base key.

6. The method of claim 1, further comprising:
   generating an encryption key for non-access stratum (NAS) signaling and an integrity key for NAS signaling based at least in part on the AMF base key.

7. The method of claim 1, wherein the AMF base key is configured exclusively for generating the target base station base key.

8. A method for wireless communication at a target access and mobility function (AMF), comprising:
   identifying a handover trigger that triggers a handover from a source AMF to the target AMF;
   receiving, from the source AMF, an AMF base key, wherein the AMF base key is based at least in part on a downlink non-access stratum (NAS) count;
   receiving, from the source AMF, a target base station base key, wherein the target base station base key is based at least in part on the AMF base key and an uplink NAS count, and wherein the AMF base key is different from the target base station base key; and
   transmitting the target base station base key to a target base station.

9. The method of claim 8, wherein the AMF base key is distinct from an intermediate key used at the source AMF.

10. The method of claim 8, wherein the AMF base key comprises a chained key of a network entity base key.

11. The method of claim 8, further comprising:
    generating an encryption key for non-access stratum (NAS) signaling and an integrity key for NAS signaling based at least in part on the AMF base key.

12. A method for wireless communication at a user equipment (UE), comprising:
    receiving a handover command message via a source access and mobility function (AMF) that triggers a handover of the UE from the source AMF to a target AMF;
    receiving an indication of a downlink non-access stratum (NAS) count;
    in response to the handover command message, generating an AMF base key based at least in part on inputting the downlink NAS count into a key derivation function;
    receiving an indication of a NAS count value; and
    generating a target base station base key based at least in part on inputting the AMF base key and the NAS count value into the key derivation function.

13. The method of claim 12, further comprising:
    receiving an indication of an updated NAS count value; and
    refreshing the target base station base key based at least in part on the updated NAS count value.

14. The method of claim 12, further comprising:
    receiving an indication of an updated AMF base key; and
    refreshing the target base station base key based at least in part on the updated AMF base key.

15. The method of claim 12, further comprising:
    receiving an indication of an updated downlink NAS count; and refreshing the target base station base key based at least in part on the updated downlink NAS count.

16. The method of claim 12, further comprising:
communicating with a target base station based at least in part on the target base station base key.

17. The method of claim 12, further comprising:
generating an intermediate key based at least in part on a network entity base key, wherein the intermediate key is different from the AMF base key.

18. The method of claim 12, further comprising:
receiving an indication that the AMF base key is configured exclusively for generating the target base station base key.

19. A method for wireless communication at a source access and mobility function (AMF), comprising:
identifying a handover trigger that triggers a handover from the source AMF to a target AMF;
generating, in response to the handover trigger, an AMF base key based at least in part on inputting a downlink non-access stratum (NAS) count into a key derivation function;
generating a target base station base key based at least in part on inputting the AMF base key and an uplink NAS count into the key derivation function;
transmitting both of the AMF base key and the target base station base key to the target AMF; and
generating an encryption key for non-access stratum (NAS) signaling and an integrity key for NAS signaling based at least in part on the AMF base key.

20. A method for wireless communication at a target access and mobility function (AMF), comprising:
identifying a handover trigger that triggers a handover from a source AMF to the target AMF;
receiving an AMF base key from the source AMF, wherein the AMF base key is based at least in part on a downlink non-access stratum (NAS) count;
receiving a target base station base key from the source AMF, wherein the target base station base key is based at least in part on the AMF base key and an uplink NAS count;
transmitting the target base station base key to a target base station; and
generating an encryption key for non-access stratum (NAS) signaling and an integrity key for NAS signaling based at least in part on the AMF base key.

21. A method for wireless communication at a user equipment (UE), comprising:
receiving a handover command message via a source access and mobility function (AMF) that triggers a handover of the UE from the source AMF to a target AMF;
receiving an indication of a downlink non-access stratum (NAS) count;
generating an AMF base key based at least in part on inputting the downlink NAS count into a key derivation function and in response to the handover command message;
receiving an indication of a NAS count value;
generating a target base station base key based at least in part on inputting the AMF base key and the NAS count value into the key derivation function;
receiving an indication of an updated downlink NAS count; and
refreshing the target base station base key based at least in part on the updated downlink NAS count.

22. An apparatus for wireless communication at a source access and mobility function (AMF), comprising:
a processor;
memory coupled with the processor; and
instructions stored in the memory and operable, when executed by the processor, to cause the apparatus to:
identify a handover trigger that triggers a handover from the source AMF to a target AMF;
in response to the handover trigger, generate an AMF base key based at least in part on inputting a downlink non-access stratum (NAS) count into a key derivation function;
generate a target base station base key based at least in part on inputting the AMF base key and an uplink NAS count into the key derivation function; and
transmit, by the source AMF to the target AMF, both of the AMF base key and the target base station base key, wherein the AMF base key is different from the target base station base key.

23. An apparatus for wireless communication at a target access and mobility function (AMF), comprising:
a processor;
memory coupled with the processor; and
instructions stored in the memory and operable, when executed by the processor, to cause the apparatus to:
identify a handover trigger that triggers a handover from a source AMF to the target AMF;
receive, from the source AMF, an AMF base key, wherein the AMF base key is based at least in part on a downlink non-access stratum (NAS) count;
receive, from the source AMF, a target base station base key, wherein the target base station base key is based at least in part on the AMF base key and an uplink NAS count, and wherein the AMF base key is different from the target base station base key; and
transmit the target base station base key to a target base station.

24. An apparatus for wireless communication at a user equipment (UE), comprising:
a processor;
memory coupled with the processor; and
instructions stored in the memory and operable, when executed by the processor, to cause the apparatus to:
receive a handover command message via a source access and mobility function (AMF) that triggers a handover of the UE from the source AMF to a target AMF;
receive an indication of a downlink non-access stratum (NAS) count;
in response to the handover command message, generate an AMF base key based at least in part on inputting the downlink NAS count into a key derivation function;
receive an indication of a NAS count value; and
generate a target base station base key based at least in part on inputting the AMF base key and the NAS count value into the key derivation function.

25. A non-transitory computer readable medium storing code for wireless communication at a source access and mobility function (AMF), the code comprising instructions executable by a processor to:
identify a handover trigger that triggers a handover from the source AMF to a target AMF;
in response to the handover trigger, generate an AMF base key based at least in part on inputting a downlink non-access stratum (NAS) count into a key derivation function;

generate a target base station base key based at least in part on inputting the AMF base key and an uplink NAS count into the key derivation function; and transmit, by the source AMF to the target AMF, both of the AMF base key and the target base station base key, wherein the AMF base key is different from the target base station base key.

26. A non-transitory computer readable medium storing code for wireless communication at a target access and mobility function (AMF), the code comprising instructions executable by a processor to:

identify a handover trigger that triggers a handover from a source AMF to the target AMF;

receive, from the source AMF, an AMF base key, wherein the AMF base key is based at least in part on a downlink non-access stratum (NAS) count;

receive, from the source AMF, a target base station base key, wherein the target base station base key is based at least in part on the AMF base key and an uplink NAS count, and wherein the AMF base key is different from the target base station base key; and transmit the target base station base key to a target base station.

27. A non-transitory computer readable medium storing code for wireless communication at a user equipment (UE), the code comprising instructions executable by a processor to:

receive a handover command message via a source access and mobility function (AMF) that triggers a handover of the UE from the source AMF to a target AMF;

receive an indication of a downlink non-access stratum (NAS) count;

in response to the handover command message, generate an AMF base key based at least in part on inputting the downlink NAS count into a key derivation function;

receive an indication of an NAS count value; and generate a target base station base key based at least in part on inputting the AMF base key and the NAS count value into the key derivation function.

* * * * *